(12) United States Patent
Kim et al.

(10) Patent No.: US 9,426,811 B2
(45) Date of Patent: Aug. 23, 2016

(54) METHOD AND DEVICE FOR AVOIDING INTER-CELL INTERFERENCE IN A WIRELESS ACCESS SYSTEM

(75) Inventors: Hakseong Kim, Anyang-si (KR); Mochan Yang, Seoul (KR); Sungcheol Yoo, Incheon (KR); Ohsoon Shin, Seoul (KR); Yoan Shin, Seoul (KR)

(73) Assignees: LG ELECTRONICS INC., Seoul (KR); SUNGKYUNKWAN UNIVERSITY FOUNDATION FOR CORPORATE, Suwon-Si (KR)

( * ) Notice: Subject to any disclaimer, the term of this patent is extended or adjusted under 35 U.S.C. 154(b) by 229 days.

(21) Appl. No.: 13/984,772

(22) PCT Filed: Oct. 6, 2011

(86) PCT No.: PCT/KR2011/007419
§ 371 (c)(1),
(2), (4) Date: Aug. 9, 2013

(87) PCT Pub. No.: WO2012/108604
PCT Pub. Date: Aug. 16, 2012

(65) Prior Publication Data
US 2013/0322323 A1    Dec. 5, 2013

Related U.S. Application Data

(60) Provisional application No. 61/440,874, filed on Feb. 9, 2011.

(51) Int. Cl.
*H04W 72/08* (2009.01)
*H04J 11/00* (2006.01)
(Continued)

(52) U.S. Cl.
CPC ........ *H04W 72/082* (2013.01); *H04B 7/15542* (2013.01); *H04J 11/005* (2013.01); *H04W 16/10* (2013.01); *H04W 84/047* (2013.01)

(58) Field of Classification Search
USPC .................................................. 370/310–315
See application file for complete search history.

(56) References Cited

U.S. PATENT DOCUMENTS

| 8,055,188 B2 * | 11/2011 | Taori | H04B 7/15592 |
|---|---|---|---|
| | | | 370/310 |
| 2007/0217367 A1 * | 9/2007 | Lee | H04B 7/2606 |
| | | | 370/335 |

(Continued)

FOREIGN PATENT DOCUMENTS

| IN | WO 2010106556 A2 * | 9/2010 | .......... H04W 72/085 |
|---|---|---|---|
| KR | 10-2009-0102419 A | 9/2009 | |

(Continued)

*Primary Examiner* — Charles C Jiang
*Assistant Examiner* — Kyaw Z Soe
(74) *Attorney, Agent, or Firm* — Birch, Stewart, Kolasch & Birch, LLP

(57) ABSTRACT

According to the present invention, a method for a relay node (RN) to reallocate a resource in order to avoid inter-cell interference (ICI) in a wireless access system includes: overhearing a control channel including downlink or uplink resource allocation information transmitted by a plurality of base stations to terminals in the coverage area of each base station; sharing the RN by means of the plurality of base stations; confirming that there is a resource area in which conflicts are occurring by comparing resource areas allocated to terminals in the coverage area of the RN through the control channel; and, if it is determined, on the basis of the confirmation result, that there is a resource area in which conflicts are occurring, reallocating a resource to the resource area in which conflicts are occurring.

11 Claims, 19 Drawing Sheets

(51) Int. Cl.
  *H04W 84/04*  (2009.01)
  *H04B 7/155*  (2006.01)
  *H04W 16/10*  (2009.01)

(56) References Cited

U.S. PATENT DOCUMENTS

2009/0233544 A1* 9/2009 Oyman .............. H04B 7/15592
  455/7
2010/0238826 A1* 9/2010 Borran .................... H04B 7/15
  370/252
2010/0240380 A1  9/2010 Yim et al.
2011/0143804 A1* 6/2011 Blomgren ............. H04W 52/12
  455/522
2012/0002598 A1* 1/2012 Seo ....................... H04B 7/2606
  370/315
2012/0156984 A1* 6/2012 Gan .................. H04B 7/15542
  455/7
2013/0064197 A1* 3/2013 Novak .................. H04W 36/06
  370/329
2013/0223257 A1* 8/2013 Balercia ............. H04B 7/15557
  370/252

FOREIGN PATENT DOCUMENTS

KR  10-2009-0108358 A  10/2009
KR  10-2009-0119527 A  11/2009

* cited by examiner

METHOD AND DEVICE FOR AVOIDING INTER-CELL INTERFERENCE IN A WIRELESS ACCESS SYSTEM

CROSS REFERENCE TO RELATED APPLICATIONS

This application is the National Phase of PCT/KR2011/007419 filed on Oct. 6, 2011, which claims priority under 35 U.S.C. 119(e) to U.S. Provisional Application No. 61/440,874 Feb. 9, 2011, all of which are hereby expressly incorporated by reference into the present application.

TECHNICAL FIELD

This specification relates to a wireless access system and, more particularly, to a method and apparatus for avoiding Inter-Cell Interference (ICI).

BACKGROUND ART

A $3^{rd}$ Generation Partnership Project Long Term Evolution (3GPP LTE)-Advanced as the next-generation mobile communication system standard supports multi-hop relay transmission technology in which cell coverage is extended by installing Relay Nodes (RNs) in a shadow area and a cell boundary area and high transfer rate can be provided to users.

Furthermore, Orthogonal Frequency Division Multiple Access (OFDMA) technology is a modulation and decoding scheme for overcoming a multi-path fading phenomenon in a radio channel and is advantageous in that time, frequency, and power resources can be flexibly allocated to a plurality of users using a plurality of subcarriers.

Resource Allocation (RA) using an OFDMA scheme has high efficiency because each resource does not have a limit due to external interference by taking only a single cell into consideration. In actual multiple cells, however, great interference is generated between neighboring cells when the cells use the same frequency resources.

In order to overcome this problem, there was proposed a method of changing a frequency reuse pattern in a cell and a cell boundary area. The method, however, is problematic in that efficiency is low in terms of frequency use because each cell is divided into several areas and frequencies are statically allocated to the areas.

DISCLOSURE

Technical Problem

An object of this specification is to provide a method of reallocating resources that collide against each other within the coverage of an RN in order to implement a fully dynamic RA method in each cell and also avoid Inter-Cell Interference (ICI).

Technical Solution

This specification provides a method of an RN reallocating resources in order to avoid Inter-Cell Interference (ICI) in a wireless access system, including the steps of overhearing a control channel including downlink or uplink resource allocation information transmitted from each of a plurality of eNBs to UEs within the coverage of the eNB, wherein the plurality of eNBs shares the RN, checking whether or not a colliding resource region is present by comparing resource regions, allocated to UEs within the coverage of the RN, with each other through the control channel, and performing a resource reallocation process on the colliding resource region if, as a result of the check, a colliding resource region is present.

Furthermore, the step of performing the resource reallocation process includes the step of exchanging the colliding resource region with resource regions allocated to UEs outside the coverage of the RN.

Furthermore, the step of exchanging the resource regions includes the steps of comparing a Signal-to-Interference plus Noise Ratio (SINR) value of the colliding resource region with an SINR value of each of the resource regions allocated to the UEs outside the coverage of the RN and determining a resource region, having the smallest SINR value difference as a result of the comparison, as the resource region to be exchanged.

Furthermore, this specification further includes the step of sending downlink or uplink data to the UEs through the reallocated resource region.

Furthermore, the plurality of eNBs performs a dynamic resource allocation process based on Full Frequency Reuse (FFR).

Furthermore, the plurality of eNBs includes 3 eNBs, and the RN is a Shared Relay Node (SRN) shared by the 3 eNBs.

Furthermore, the step of performing the resource reallocation process includes the steps of classifying all the UEs within the coverage of the RN into UEs corresponding to each of the eNBs and sending ratio information about the classified UEs to each of the eNBs.

Furthermore, the control channel or the data is transmitted through a specific subframe, the specific subframe includes a first time zone and a second time zone, and the first time zone and the second time zone comprise respective downlink and uplink regions.

Furthermore, signals between the eNB and the UE are transmitted and received in the first time zone, and signals between the eNB and the UE and/or the RN and the UE are transmitted and received in the second time zone.

Furthermore, the RN uses X2 signaling along with the plurality of eNBs.

Furthermore, the control channel is a PDCCH or a PUCCH.

Furthermore, the step of performing the resource reallocation process includes the step of sending information indicative of the colliding resource region to the plurality of eNBs.

Furthermore, this specification provides an RN for reallocating resources in order to avoid Inter-Cell Interference (ICI) in a wireless access system, including an RF communication unit for transmitting and receiving radio signals to and from an outside and a processor coupled with the RF communication unit, wherein the processor performs control so that a control channel including downlink or uplink resource allocation information transmitted from each of a plurality of eNBs to UEs within the coverage of the eNB is overheard, checks whether or not a colliding resource region is present by comparing resource regions, allocated to UEs within the coverage of the RN, with each other through the control channel, and performs control so that a resource reallocation process is performed on the colliding resource region if, as a result of the check, a colliding resource region is present, wherein the plurality of eNBs shares the RN.

Furthermore, the processor performs control so that the resource reallocation process is performed by exchanging the colliding resource region with resource regions allocated to UEs outside the coverage of the RN.

Furthermore, the processor compares a Signal-to-Interference plus Noise Ratio (SINR) value of the colliding resource region with an SINR value of each of the resource regions allocated to the UEs outside the coverage of the RN and determines a resource region, having the smallest SINR value difference as a result of the comparison, as the resource region to be exchanged.

Furthermore, the processor controls the RF communication unit so that downlink or uplink data is transmitted to the UEs through the reallocated resource region.

Furthermore, the plurality of eNBs performs a dynamic resource allocation process based on Full Frequency Reuse (FFR).

Furthermore, the processor classifies all the UEs within the coverage of the RN into UEs corresponding to each of the eNBs and controls the RF communication unit so that ratio information about the classified UEs is transmitted to each of the eNBs.

Furthermore, the processor controls the RF communication unit so that information indicative of the colliding resource region is transmitted to the plurality of eNBs.

Advantageous Effects

This specification is advantageous in that Inter-Cell Interference (ICI) can be avoided in such a manner that an SRN reallocates resources to collided resource regions if resource regions allocated to UEs within the SRN collide against each other while overhearing a downlink or uplink signal transmitted from an eNB to the UEs.

MODE FOR INVENTION

Figure 1:
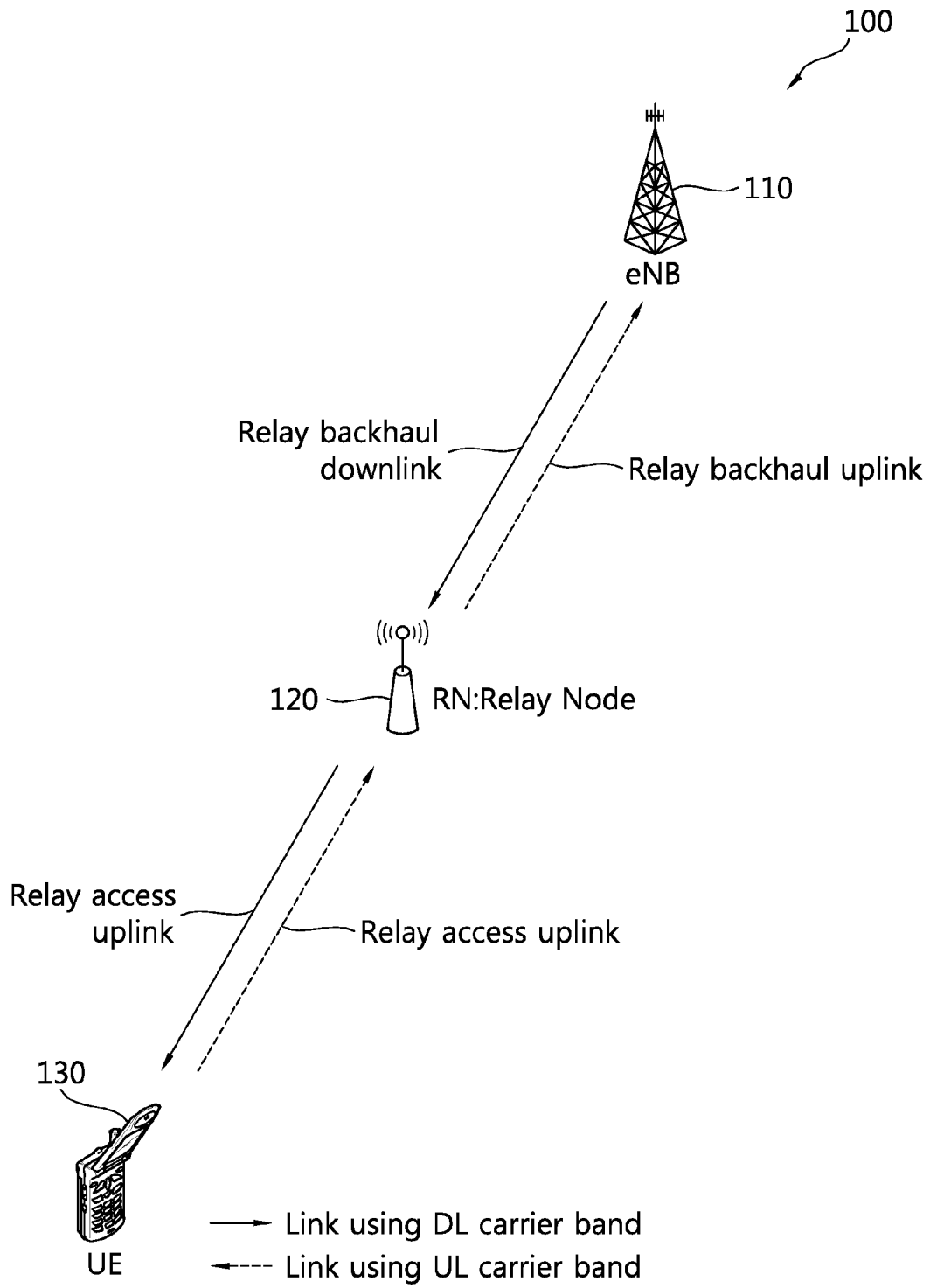
FIG. 1 is a diagram showing the configuration of a relay backhaul link and a relay access link in a wireless communication system 100 to which an embodiment of this specification can be applied.

Hereinafter, preferred embodiments of the present invention are described in detail with reference to the accompanying drawings. The detailed description to be disclosed below along with the accompanying drawings is intended to describe an exemplary embodiment of the present invention, but is not intended to describe a single embodiment that may be implemented by the present invention.

The following detailed description includes details in order to provide the full understanding of the present invention. However, those skilled in the art will appreciate that the present invention can be implemented without the details. For example, the following detailed description is given assuming that a mobile communication system is a 3GPP LTE system, but can also be applied to other specific mobile communication systems except matters unique to 3GPP LTE.

In some cases, a known structure and apparatus may be omitted in order to avoid making vague the concept of the present invention or may be shown in the form of a block diagram on the basis of core functions of each structure and apparatus. Furthermore, in the entire specification, the same reference numerals are used to denote the same elements.

Moreover, in the following description, it is assumed that a terminal commonly refers to a mobile or fixed type device in a user terminal, such as User Equipment (UE), a Mobile Station (MS), and an advanced mobile station. It is also assumed that a base station commonly refers to a specific node in a network terminal which communicates with terminals, such as a Node B, an eNode B, and an Access Point (AP). A relay can be called in various ways, for example, a Relay Node (RN) or a Relay Station (RS).

In a mobile communication system, UE and a relay can receive information from an eNB through downlink, and the UE and the relay can send information through uplink. The information transmitted or received by the UE and the relay can include data and various pieces of control information, and a variety of physical channels are present depending on the type and use of information transmitted or received by the UE and the relay.

FIG. 1 is a diagram showing the configuration of a relay backhaul link and a relay access link in a wireless communication system 100 to which an embodiment of this specification can be applied.

In a $3^{rd}$ Generation Partnership Project Long Term Evolution-Advanced (3GPP LTE-A) system, a role for forwarding a link connection between an eNB 110 and UE 130 is introduced into an RN 120, and two types of links having different attributes are applied to respective UL and DL carrier frequency bands. A connection link part configured between the links of an eNB and an RN is defined as a backhaul link. Transmission using downlink resources according to a Frequency Division Duplex (FDD) or Time Division Duplex (TDD) method can be called backhaul downlink, transmission using uplink resources according to an FDD or TDD method can be called backhaul uplink.

In contrast, a connection link part configured between an RN and UEs is defined as an RN access link. If transmission using a downlink frequency band (in the case of FDD) or downlink subframe (in the case of TDD) resources is performed in the RN access link, this can be called access downlink. If transmission using an uplink frequency band (in the case of FDD) or uplink subframe (in the case of TDD) resources is performed in the RN access link, this can be called access uplink.

The RN can receive information from the eNB through RN backhaul downlink and can send information to the eNB through RN backhaul uplink. Furthermore, the RN can receive information to the UE through RN access downlink and can receive information from the UE through RN access uplink.

The RN can perform an initial cell search task, such as synchronization with the eNB. To this end, the RN can receive a synchronization channel from the eNB, perform synchronization with the eNB, and obtain information, such as a cell ID. Thereafter, the RN can receive a physical broadcast channel from the eNB and obtain broadcast information within a cell. Meanwhile, the RN can receive an RN backhaul downlink reference signal in the initial cell search step and check a channel state of RN backhaul downlink. The RN can receive a Relay-Physical Downlink Control Channel (R-PDCCH) and/or a Relay-Physical Downlink Shared Channel (R-PDSCH) in order to obtain more detailed system information.

Meanwhile, if the RN accesses the eNB for the first time or does not have radio resources for signal transmission, the RN can perform a random access process on the eNB. To this end, the RN can send a preamble through a Physical Random Access Channel (PRACH) and receive a response message for the random access through an R-PDCCH and an R-PDSCH corresponding to the R-PDCCH.

In the case of contention-based random access except the case of handover, a contention resolution procedure, such as the transmission of an additional PRACH and the reception of additional R-PDCCH/R-PDSCH, can be performed.

After performing the above-described procedure, the RN can perform the transmission of an R-PDCCH/R-PDSCH and a Relay-Physical Uplink Shared CHannel (R-PUSCH)/Relay-Physical Uplink Control Channel (R-PUCCH) as a common uplink/downlink signal transmission procedure.

Here, control information transmitted from the RN to the eNB through uplink or received by the eNB from the RN can include an ACK/NACK signal, a Channel Quality Indicator (CQI), a Precoding Matrix Index (PMI), a Rank Indicator (RI), etc. In the case of a $3^{rd}$ Generation Partnership Project Long Term Evolution (3GPP LTE)-A system, the RN can send control information, such as a CQI, a PMI, and an RI, through an R-PUSCH/R-PUCCH.

Figure 2:
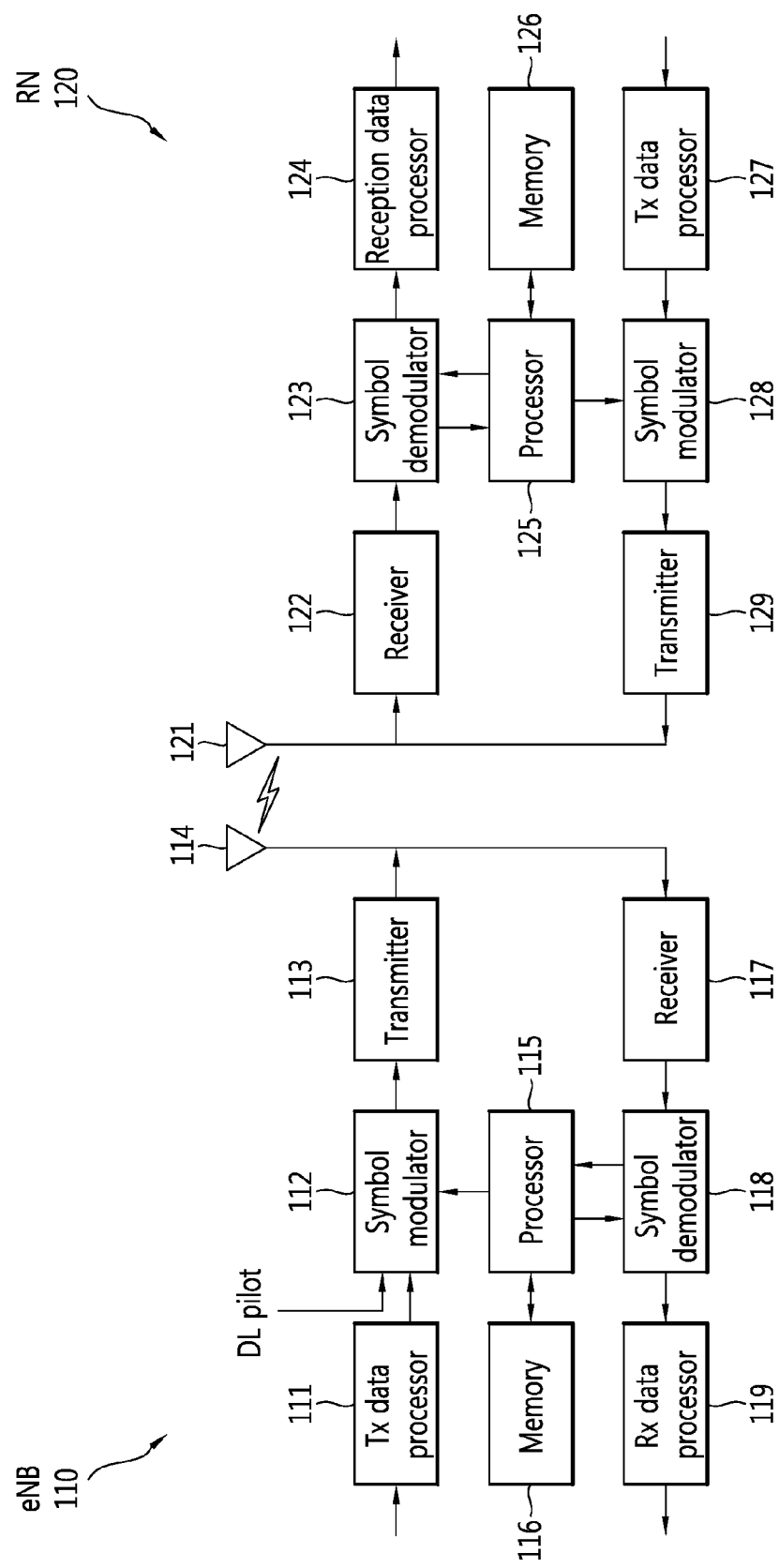
FIG. 2 is an internal block diagram of an eNB 110 and a relay 120 in the wireless communication system 100 to which an embodiment of this specification can be applied.

FIG. 2 is an internal block diagram of the eNB 110 and the RN 120 in the wireless communication system 100 to which an embodiment of this specification can be applied.

Although one eNB 110 and one RN 120 are illustrated in order to simply show the wireless communication system 100, the wireless communication system 100 can include one or more eNBs and/or one or more RNs.

Referring to FIG. 2, the eNB 110 can include a Tx data processor 111, a symbol modulator 112, a transmitter 113, a Tx/Rx antenna 114, a processor 115, a memory 116, a receiver 117, a symbol demodulator 118, and an Rx data processor 119.

Here, the transmitter 113 and the receiver 117 may be represented by an RF communication unit.

Furthermore, the RN 120 may include a Tx data processor 127, a symbol modulator 128, a transmitter 129, a Tx/Rx antenna 121, a processor 125, a memory 126, a receiver 122, a symbol demodulator 123, and an Rx data processor 124. Although the antennas 114 and 121 are illustrated in the eNB 110 and the RN 120, respectively, as one, each of the eNB 110 and the RN 120 includes a plurality of antenna. Likewise, the transmitter 129 and the receiver 122 may be represented by an RF communication unit.

Accordingly, the eNB 110 and the RN 120 according to the present invention support a Multiple Input Multiple Output (MIMO) system. The eNB 110 according to the present invention can support both a Single User-MIMO (SU-MIMO) method and a Multi User-MIMO (MU-MIMO) method.

In downlink, the Tx data processor 111 receives traffic data, formats and codes the received traffic data, interleaves and modulates (or performs symbol mapping on) the coded traffic data, and provides modulation symbols ("data symbols"). The symbol modulator 112 receives the data symbols and pilot symbols, processes the received data symbols and pilot symbols, and provides the stream of the symbols.

The symbol modulator 112 multiplexes data and the pilot symbols and sends the multiplexed data and pilot symbols to the transmitter 113. Here, each of the transmission symbols may be a data symbol, a pilot symbol, or a null signal value. In each symbol interval, pilot symbols may be continuously transmitted. The pilot symbols may be an FDM, Orthogonal Frequency Division Multiplexing (OFDM), Time Division Multiplexing (TDM), or Code Division Multiplexing (CDM) symbol.

The transmitter 113 receives the stream of the symbols, converts the stream of the symbols into one or more analog signals, and generates a downlink signal suitable for transmission through a radio channel by additionally controlling the analog signals (e.g., amplification, filtering, and frequency-up conversion). Next, the downlink signal is transmitted to the RN through the antenna 114.

In the construction of the RN 120, the antenna 121 receives the downlink signal from the eNB and provides the received signal to the receiver 122. The receiver 122 controls (e.g., filtering, amplification, and frequency down-conversion) the received signal and obtains the samples by digitalizing the controlled signal. The symbol demodulator 123 decodes the received pilot symbols and provides the decoded symbols to the processor 125 in order to estimate a channel.

Furthermore, the symbol demodulator 123 receives a frequency response estimation value for downlink from the processor 125, obtains data symbol estimation values (i.e., estimation values of the transmitted data symbols) by performing data decoding on the received data symbols, and provides the data symbol estimation values to the RX data processor 124. The Rx data processor 124 decodes (i.e., performs symbol de-mapping on) the data symbol estimation values and recovers the transmitted traffic data by de-interleaving and decoding the decoded data symbol estimation values.

The processing by the symbol demodulator 123 and the Rx data processor 124 is complementary to the processing by the symbol modulator 112 and the Tx data processor 111 in each eNB 110.

In uplink, the Tx data processor 127 of the RN 120 processes traffic data and provides the data symbols. The symbol modulator 128 can receive the data symbols, multiplex and modulate the received data symbols, and provide the stream of the symbols to the transmitter 129. The transmitter 129 receives the stream of the symbols, generates an uplink signal by processing the stream of the symbols, and sends the uplink signal to the eNB 110 through the antenna 121.

In the eNB 110, the uplink signal is received from the RN 120 through the antenna 114, and the receiver 117 obtains samples by processing the received uplink signal. Next, the symbol demodulator 118 processes the samples and provides pilot symbols and a data symbol estimation value received for uplink. The Rx data processor 119 recovers traffic data transmitted by the RN 120 by processing the data symbol estimation value.

The processors 115 and 125 of the RN 120 and the eNB 110 instruct (e.g., control, adjust, and manage) operations in the RN 120 and the eNB 110, respectively. The processors 115 and 125 can be coupled with the respective memory units 116 and 126 for storing program codes and data. The memory units 116 and 126 are coupled with the respective processors 115 and 125, and they store an operating system, applications, and general files.

Each of the processors 115 and 125 may also be called a controller, a microcontroller, a microprocessor, or a microcomputer. Meanwhile, the processors 115 and 125 may be implemented by hardware, firmware, software, or a combination of them. If an embodiment of the present invention is implemented using hardware, Application-Specific Integrated Circuits (ASICs) or Digital Signal Processors (DSPs), Digital Signal Processing Devices (DSPDs), Programmable Logic Devices (PLDs), Field Programmable Gate Arrays (FPGAs), etc. which are configured to perform the present invention can be included in the processors 115 and 125.

Meanwhile, if embodiments of the present invention are implemented using firmware or software, the firmware or software can be configured to include modules, procedures, or functions for performing the functions or operations of the present invention. The firmware or software configured to perform the present invention can be included in the processors 115 and 125 or stored in the memory units 116 and 126 and can be driven by the processors 115 and 125.

The layers of a radio interface protocol between the wireless communication systems (networks) of the RN and the eNB can be classified into a first layer L1, a second layer L2, and a third layer L3 based on the 3 lower layers of an Open System Interconnection (OSI) model that is well known in communication systems. A physical layer belongs to the first layer and provides information transmission service through a physical channel. A Radio Resource Control (RRC) layer belongs to the third layer and provides control radio resources between UE and a network. The RN and the eNB can exchange RRC messages through a radio communication network and the RRC layer.

Figure 3:
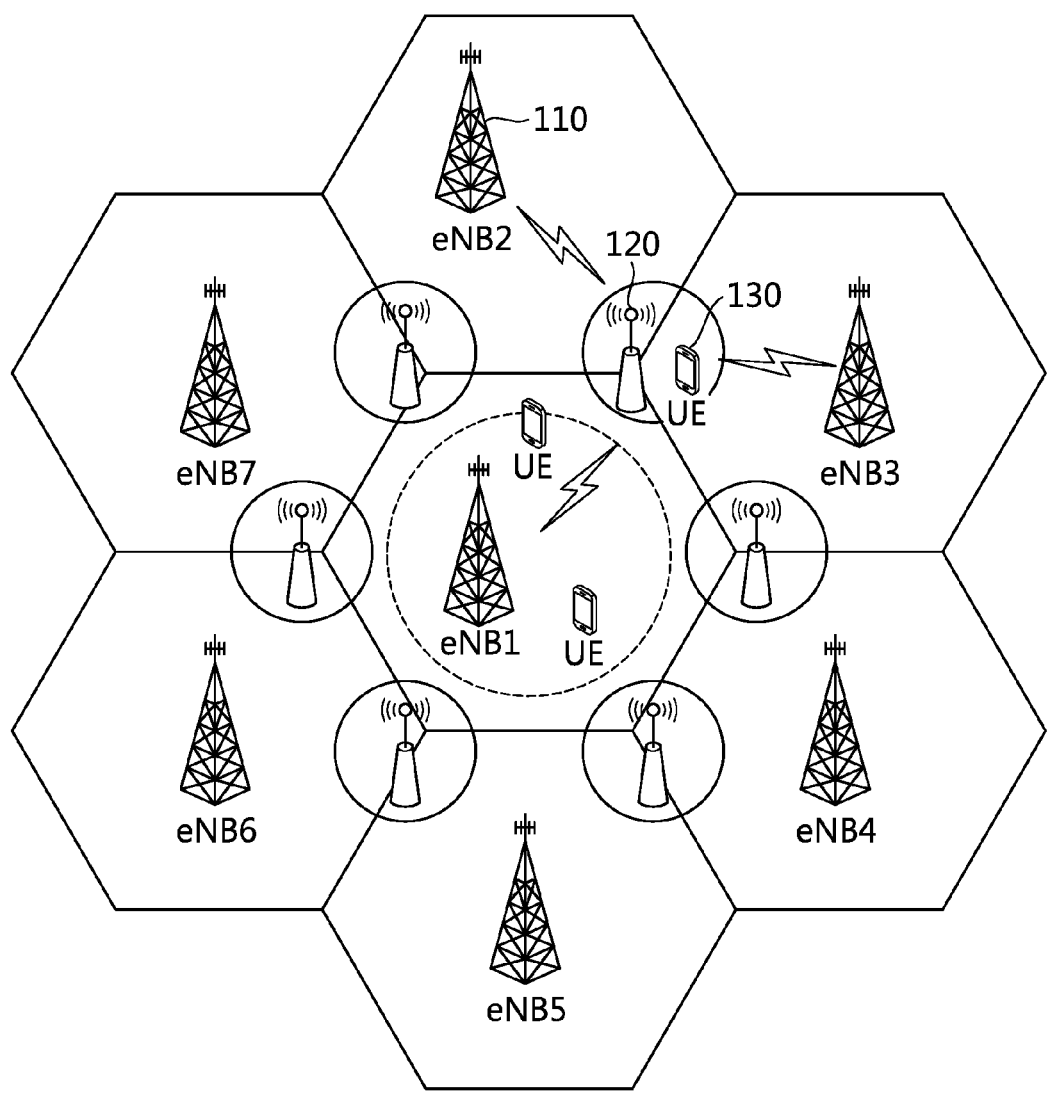
FIG. 3 is a diagram showing the structure of a multi-cell shared relay to which an embodiment of this specification can be applied.

FIG. 3 is a diagram showing the structure of a multi-cell shared relay to which an embodiment of this specification can be applied.

A method of avoiding Inter-Cell Interference (ICI) based on a Shared Relay Node (SRN) that is provided by this specification, as shown in FIG. 3, has a network basic structure based on an SRN in which three enhanced Node-Bs (eNBs) 110 share one SRN 120. Furthermore, it is assumed that the three eNBs sharing the SRN is Full Frequency Reuse (FFR).

Referring to FIG. 3, the SRN is placed at the center of the 3 independent cells, and the SRN performs data retransmission for improving the throughput of a cell boundary area, that is, a basic function of a relay. Furthermore, the SRN functions to perform control so that interference between MSs causing a reduction of performance in a cell boundary area can be avoided, while overhearing a downlink signal from each eNB and an uplink signal from UE 130. A detailed method is described later.

Here, the SRN is similar to a Type II RN in terms of its function, but supports some additional functions as compared with the Type II RN in terms of the sharing of a control signal. That is, the SRN described in this specification has characteristics, such as those of 1 to 12.

1. The SRN does not have an additional cell ID and does not generate another new cell.

2. The SRN can send a PDSCH (can perform a function of relaying Rel-8 UEs.).

3. Rel-8 UEs cannot recognize the presence of the SRN.

4. The SRN can send control (a PDCCH, a PUCCH, etc.) information to eNBs through X2 signaling, but cannot send the control information to UEs. (However, the SRN can send a PDCCH signal without interference in the case of a non-cooperative mode.)

5. The SRN can restore control (a PDCCH, a PUCCH, etc.) information.

6. The SRN newly defines X2 signaling for sharing control information with eNBs.

7. The SRN performs a relay function on only UEs which overhear downlink and uplink signals between eNBs and the UEs.

8. The SRN has a function of determining UE placed in its area in order to coordinate ICI.

The SRN has a function of determining UE within the area of the SRN based on a specific threshold by overhearing the uplink Sounding Reference Signal (SRS) of UEs.

9. The SRN can perform channel measurement on an uplink SRS signal and change an MCS Level by overhearing the uplink SRS signal.

10. The SRN shares PDCCH and PDSCH information by overhearing downlink signals from a plurality of eNBs to UEs.

11. The SRN shares PUCCH and PUSCH information by overhearing UEs->eNBs uplink signals in its area.

12. The SRN performs the management of interference between cells using information shared by methods, such as those of 10 and 11. Here, the management of interference between cells means all possible methods using data obtained by 10 and 11. That is, this specification provides a method in which an SRN not an eNBs becomes the center of a cluster, shares pieces of information of eNBs, determines UEs having ICI at a cell boundary, and directly reallocates resources for ICI avoidance based on the functions of the SRN.

Figure 4A:
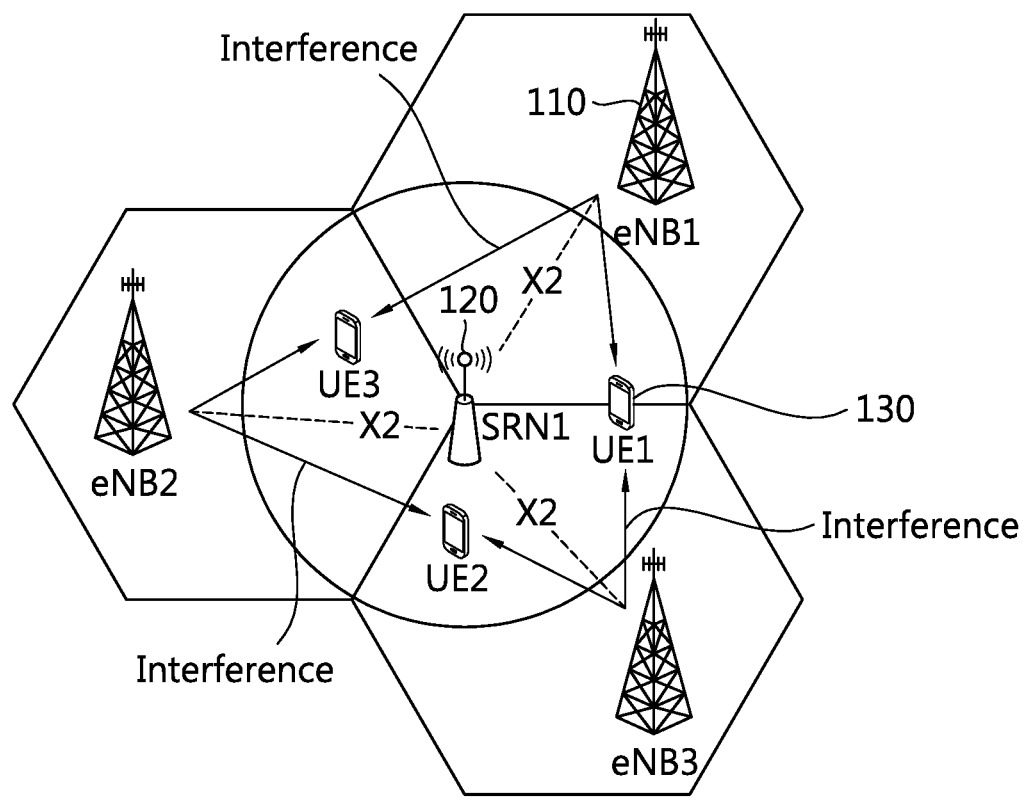
FIGS. 4(a) to 4(c) are diagrams showing a case where ICI is generated in a network structure based on an SRN.
Figure 4B:
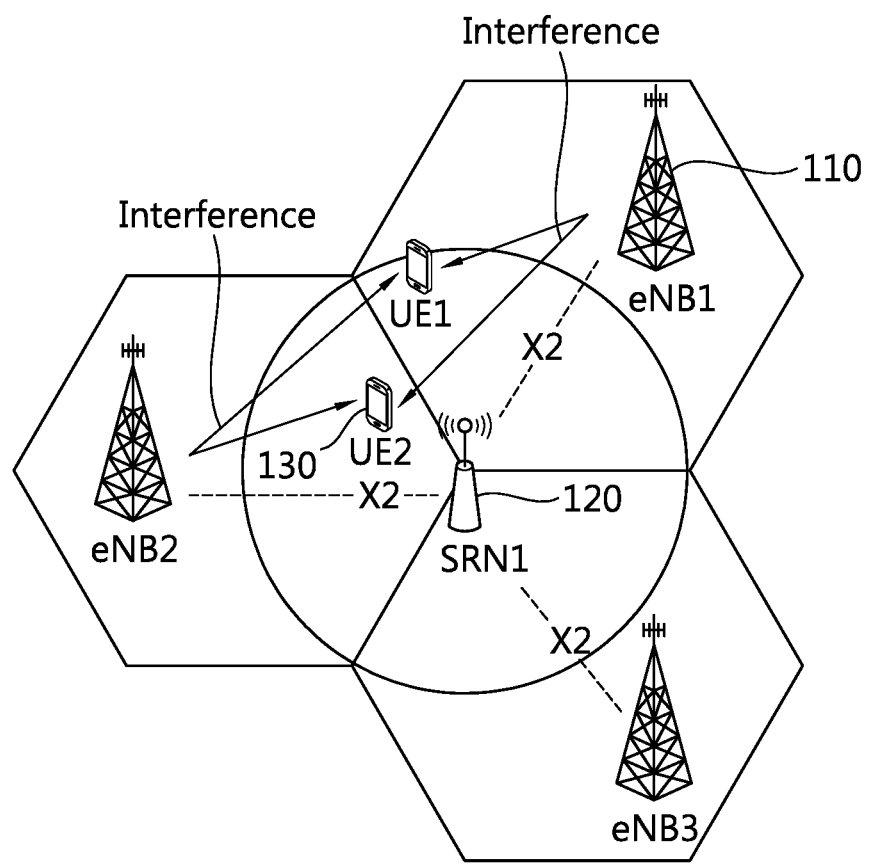
Figure 4C:
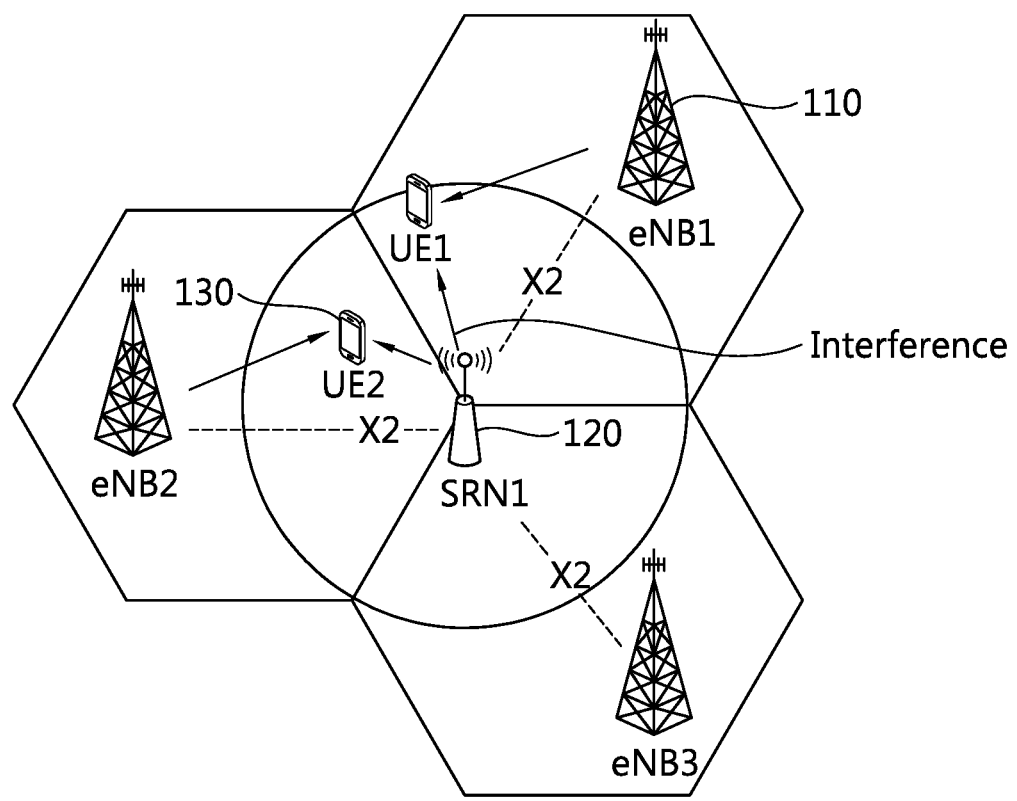

FIGS. 4(a) to 4(c) are diagrams showing a case where ICI is generated in a network structure based on an SRN.

FIG. 4a shows a case where ICI is generated because the same resources are used in direct links (i.e., eNB1-UE1, eNB2-UE2, and eNB3-UE3) between the 3 eNBs 110 and the UEs 130.

FIG. 4b shows a case where ICI is generated because the same resources are used in direct links (i.e., eNB1-UE1 and eNB2-UE2) between the two eNBs and the UEs.

FIG. 4c shows a case where ICI is generated because a signal from the access link of an SRN becomes an interference source for UE1 when an eNB1-UE1 direct link and an SRN-UE2 access link use the same resources in a process of the SRN 120 retransmitting a signal.

Figure 5:
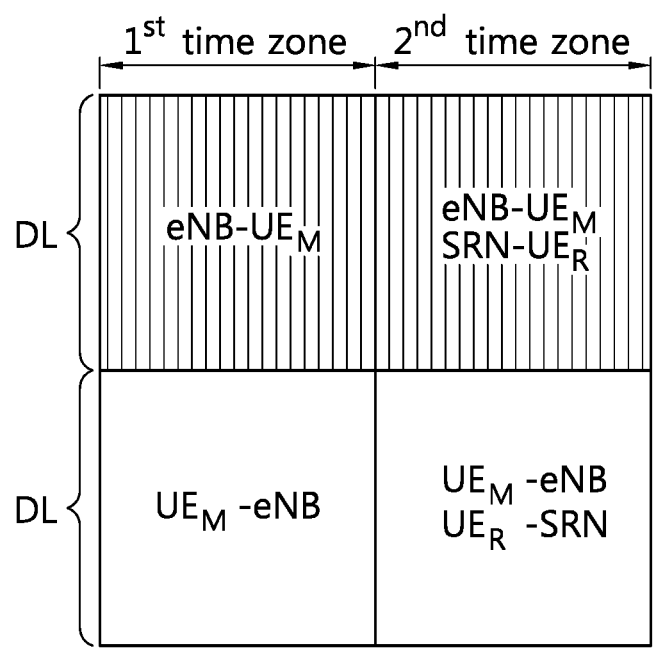
FIG. 5 shows the structure of a frame for a dynamic RA method based on an SRN to which an embodiment of this specification can be applied.

FIG. 5 shows the structure of a frame for a dynamic RA method based on an SRN to which an embodiment of this specification can be applied.

That is, FIG. 5 shows the structure of a frame in each time zone based on an SRN.

As shown in FIG. 5, in the downlink of a first time zone, an eNB sends a data packet to $UE_M$ and at the same time, an SRN overhears the packet transmitted by the eNB.

Even in a second time zone, the eNB sends a data packet to the $UE_M$, and the SRN performs relay transmission on only $UE_R$ in which NACK has occurred in the first time zone.

Here, the SRN uses resources allocated to the eNB-$UE_M$. Here, dynamic RA based on an SRN is applied to all Resource Blocks (RBs).

An eNB sends a common RS to $UE_M$ in order to implement the scheduling of an eNB-$UE_M$ link and obtain Channel Quality Indication (CQI) information about a corresponding band assigned to each resource region. Furthermore, the $UE_M$ calculates CQI from the received common RS and transfers the CQI to the eNB when corresponding uplink is opened up.

Meanwhile, in order to precisely decode a signal, in the eNB-SRN and the SRN-$UE_R$, source nodes send a dedicated Reference Signal (RS) to destination nodes. The destination nodes of each link can calculate CQI from the received dedicated RS and transfer the CQI to the source nodes when corresponding uplink is opened up.

Figure 6A:
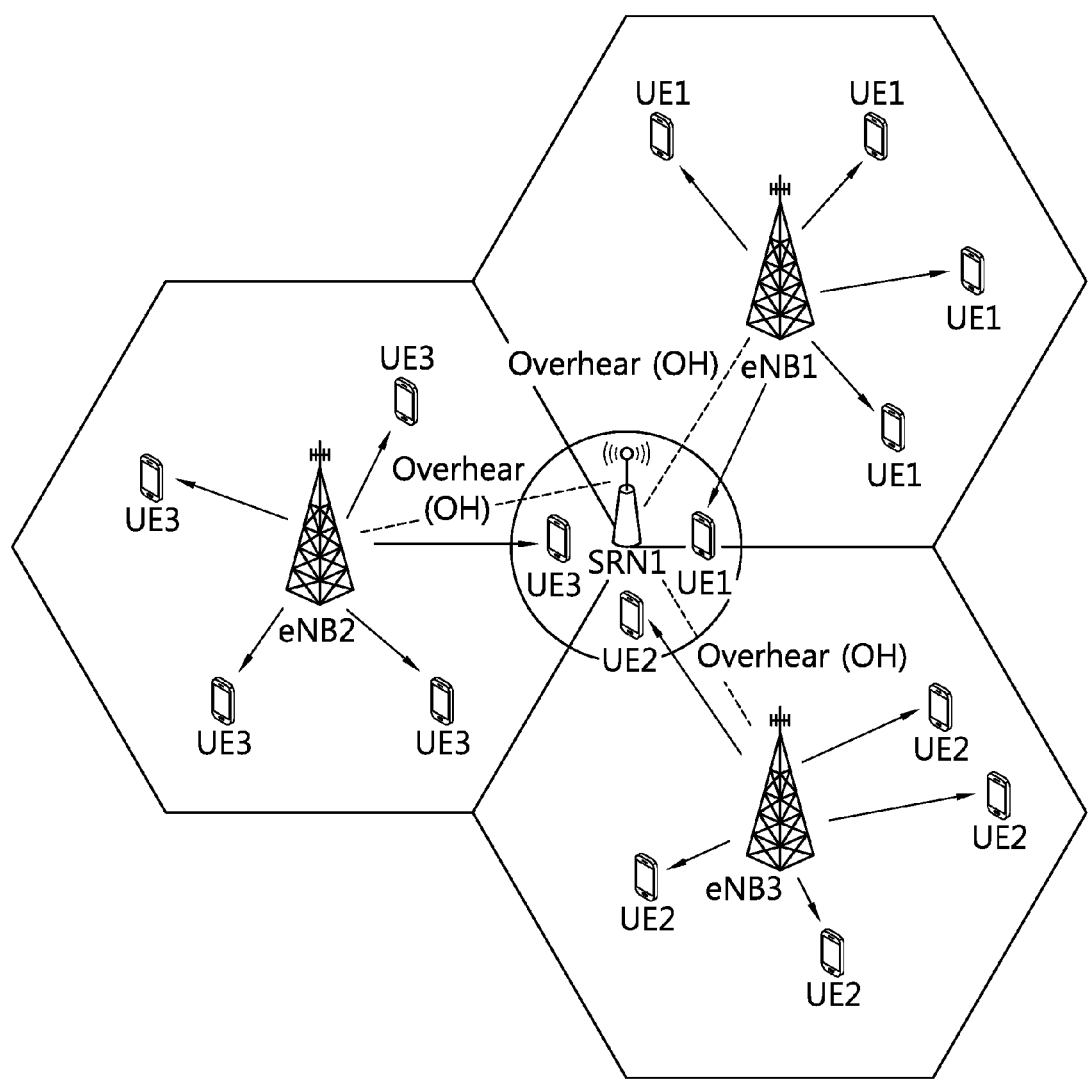
FIGS. 6(a) and 6(b) are diagrams showing a signal transmission operation in each time zone based on the SRN of FIG. 5.
Figure 6B:
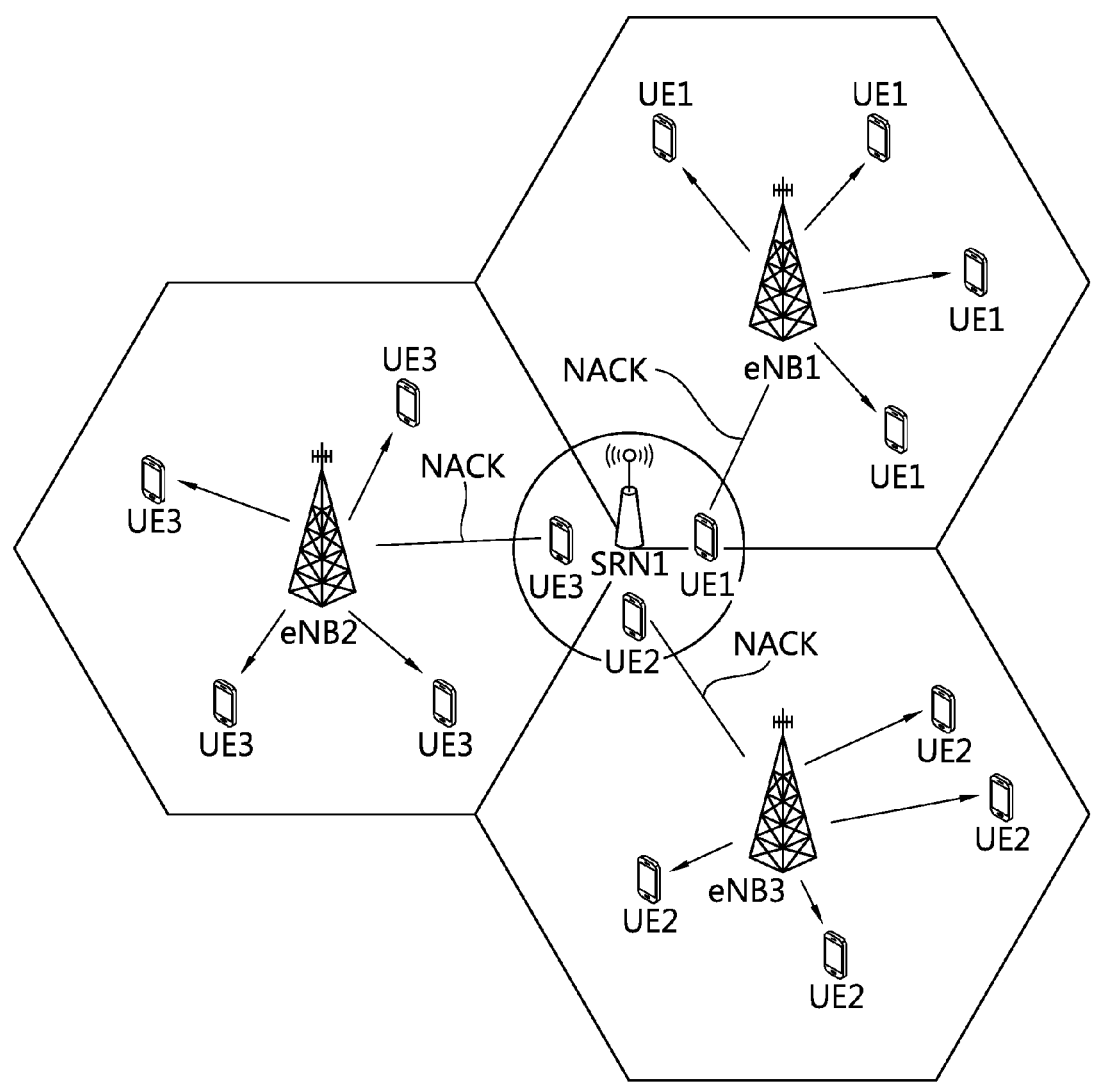

FIGS. 6(a) and 6(b) are diagrams showing a signal transmission operation in each time zone based on the SRN of FIG. 5.

As shown in FIG. 6a, in the first time zone, resources are allocated to eNB-$UE_M$, and each eNB sends a signal to UEs belonging thereto. Here, assuming that an SRN is fixed and a propagation path is excellent, the SRN perfectly overhears the signal transmitted from the eNB to the UEs.

Accordingly, resources for the eNB-SRN are not allocated because the SRN can perform signal transmission to the SRN-UE through overhearing even without a link between the eNB-SRN in the first time zone.

As shown in FIG. 6b, in the second time zone, signal transmission from the eNB to the UE is still valid, and signal transmission as the SRN->UE is valid only when NACK is generated in the eNB->the UE.

Furthermore, the operation of the SRN can be classified into a cooperative mode and a non-cooperative mode.

It is assumed that in the cooperative mode, the same resources are used in eNB->UE and in the non-cooperative mode, resources originally allocated from the eNB to the UE are used in the same manner. That is, a basis frame structure, such as FIG. 5, may be taken into consideration.

Figure 7:
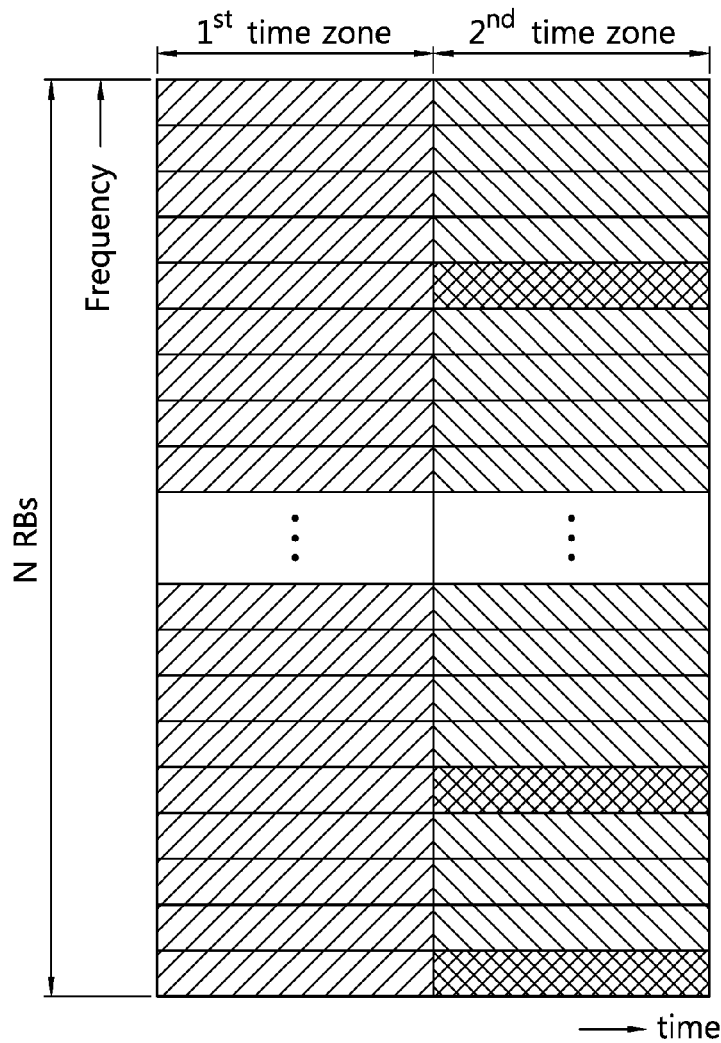
FIG. 7 is a diagram showing the dynamic RA method of each eNB in an SRN structure to which an embodiment of this specification can be applied.

FIG. 7 is a diagram showing the dynamic RA method of each eNB in an SRN structure to which an embodiment of this specification can be applied.

Each eNB takes a structure in which all RBs are dynamically allocated based on Full Frequency Reuse (FFR) into consideration and allocates RBs to UEs through a variety of scheduling schemes (e.g., PF, Max CINR, etc.).

As shown in FIG. 7, a method in which RBs do not overlap with each other is called non-overlap or non-cooperative. In the non-overlap method, an SRN takes only SRN-UE signal transmission without eNB-UE signal transmission.

Furthermore, in a resource overlap or cooperative method, the same signal is transmitted in eNB-UE and SRN-U using the same RB and a diversity gain can be expected.

Figure 8A:
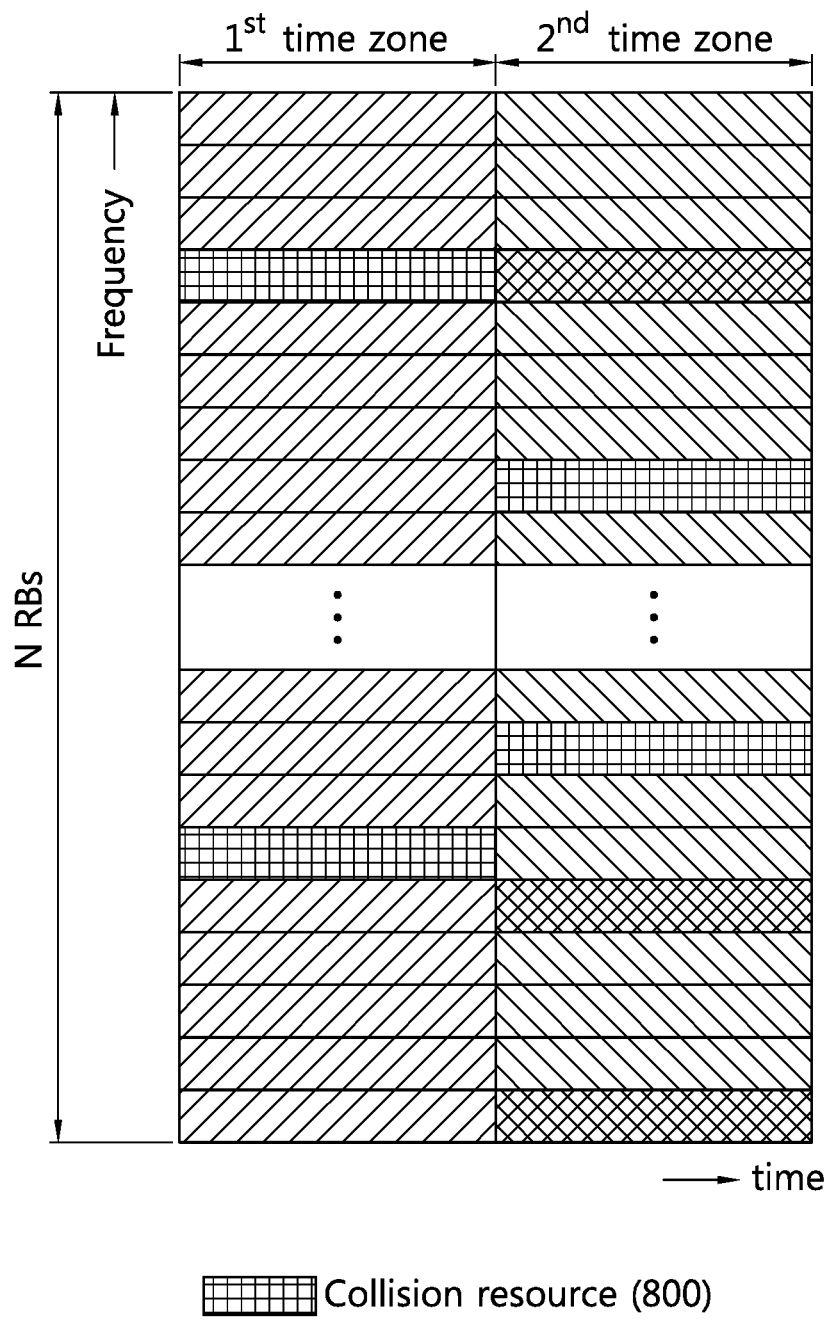
FIGS. 8(a) to 8(c) are diagrams showing a case where a collision is generated due to the same RB allocated to the terminals of a cell edge when each eNB uses a dynamic RA method.
Figure 8B:
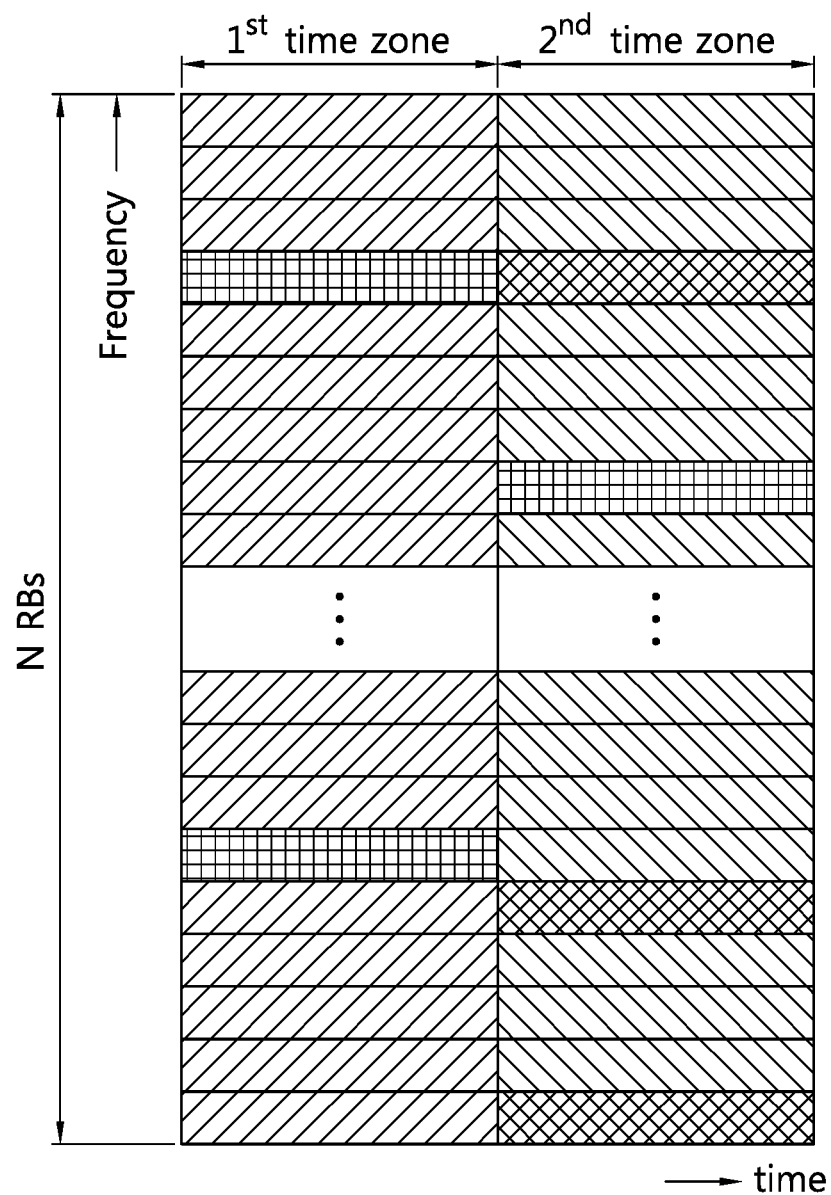
Figure 8C:
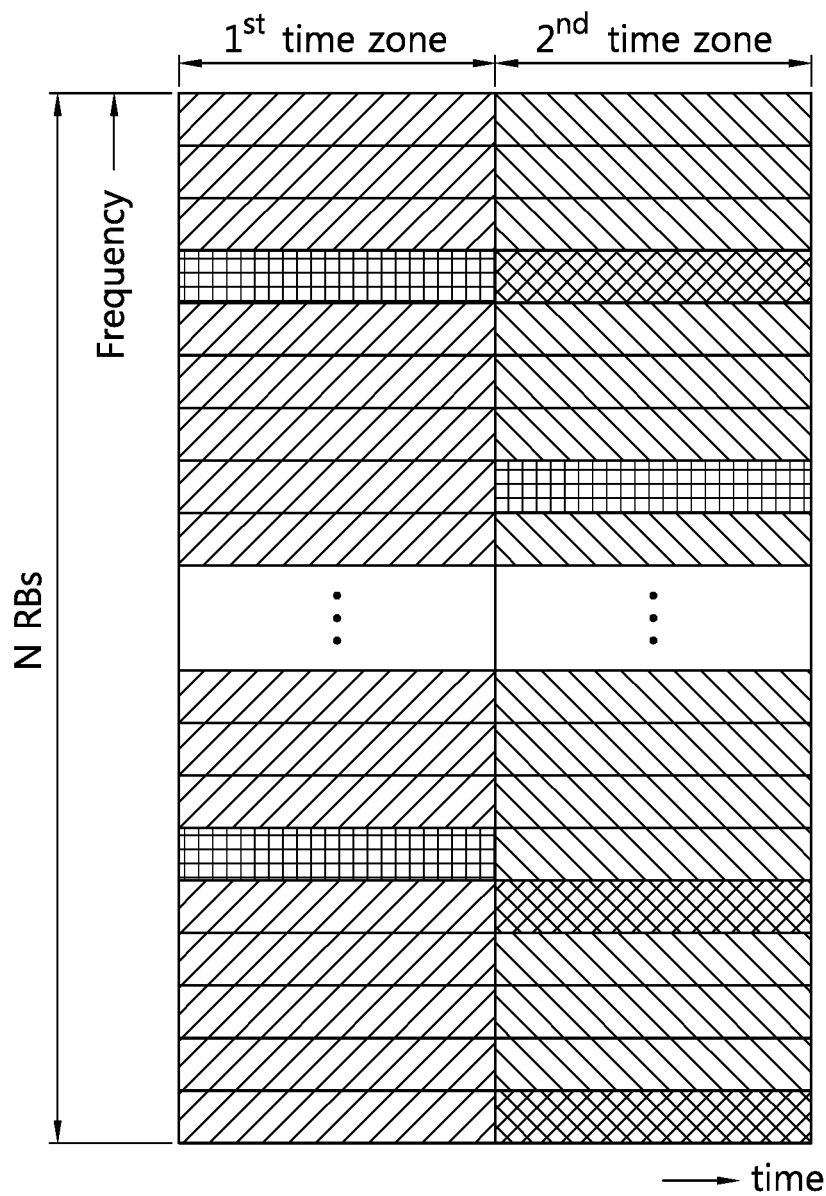

FIGS. 8(a) to 8(c) are diagrams showing a case where a collision is generated due to the same RB allocated to the UEs of a cell edge when each eNB uses a dynamic RA method.

As shown in FIGS. 8(a) to 8(c), a region 800 corresponding to a slanted part indicates a region where resources collide again each other. That is, in this case, if multiple cells take a dynamic RA method based on FFR into consideration, a collision occurs because UEs at a cell edge use the same RB.

A resource reallocation method based on an SRN for ICI avoidance in a dynamic RA method based on multi-cell FFR is described in detail below.

As described above, a resource reallocation method based on an SRN for ICI avoidance is provided using two basic advantages of an SRN.

First, an SRN is placed at the center of surrounding eNBs geographically.

This area where the SRN is placed is a cell boundary area of the eNBs and is an area where a collision between RBs is frequently generated and strong ICI from the surrounding eNBs is applied. Accordingly, the SRN has a geographical advantage in monitoring the generation of the ICI at the center of the area where ICI from several eNBs is strongly generated.

Second, the SRN can overhear signals between eNBs-UEs.

The SRN can overhear the signals between eNBs-UEs and precisely detect RBs where a collision is generated using downlink and uplink control signals from among the signals.

Method of avoiding ICI based on an SRN

First Embodiment

The first embodiment provides a method of an SRN overhearing a control channel between an eNB and UE and directly reallocating a resource region to a resource region where a collision is generated.

For the method of avoiding ICI according to the first embodiment, the following parameters are defined.

1. $UE_{a,b}$: $UE_b$ for $eNB_a$
2. $a \in \{1, \ldots, A\}$, and a and A are the index of $eNB_s$ and a total number
3. $b \in \{1, \ldots, B\}$, and b and B are the index of UE and a total number for each $eNB_a$ Furthermore, the UEs of the SRN can be classified as follows.

1. $S_c \in \{UE_{a,b} | UE_b$ for $eNB_a$ within the coverage of an SRN$\}$
2. $c \in \{1, \ldots, C\}$, and c and C are the indices and total number of UEs within the coverage of an SRN
3. $S_d = (S_c)^c \in \{UE_{a,b} | UE_b$ for $eNB_a$ outside the coverage of an SRN$\}$
4. $d \in \{1, \ldots, D\}$, and d and D are the indices and total number of UEs outside the coverage of an SRN Furthermore, the index of an RB can be represented as follows.

1. RB(k): an index $k^{th}$ RB
2. $k \in \{1, \ldots, K\}$, and k and K are the indices and total number of RBs
3. $RB\ s_1(l)$: an index $i^{th}$ RB for the UE of $S_c$
4. $l \in \{1, \ldots, L\}$, and l and L are the indices and total number of RBs for the UE of $S_c$
5. $RB\ s_d(m)$: an index $m^{th}$ RB for the UE of $S_d$
6. $m \in \{1, \ldots, M\}$, and m and M are the indices and total number of RBs for the UE of $S_d$ Furthermore, an SINR for each RB can be represented as follows.

$SINR_{RB(k)}$, $SINR_{RB(l)}$, and $SINR_{RB(m)}$ mean SINRs for respective $k^{th}$, $l^{th}$, and $m^{th}$ RBs.

An SRN searches for an RB having a collision in the area of the SRN using the parameters ad reallocates resources to the collision RB. That is, a resource reallocation method for collision avoidance in this specification can be basically divided into 1) a process of searching for a collision RB and 2) a resource reallocation process for avoiding a collision RB.

1) The process of searching for a collision RB and 2) the resource reallocation process for avoiding a collision RB are described in detail below.

Process of Searching for a Collision RB

Figure 9A:
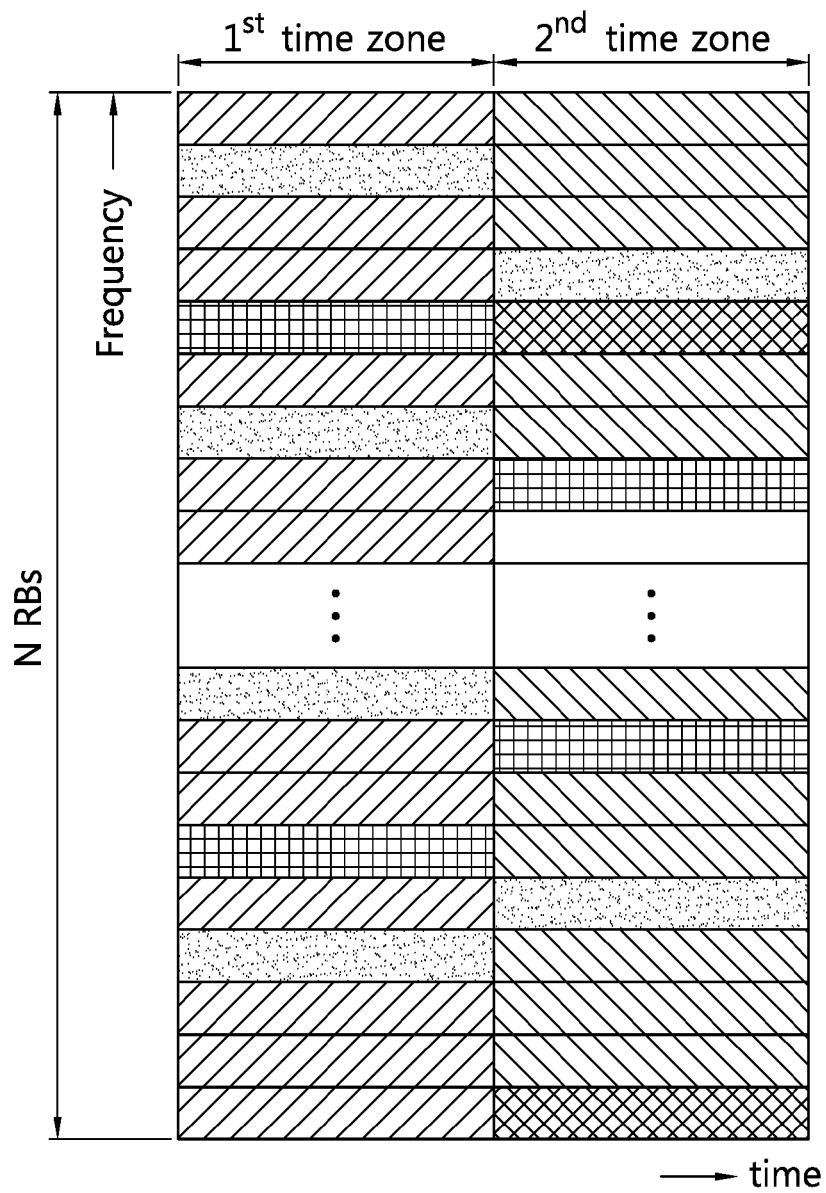
FIGS. 9(a) to 9(c) are diagrams showing the classification of RBs in a cell structure based on an SRN in accordance with a first embodiment of this specification.
Figure 9B:
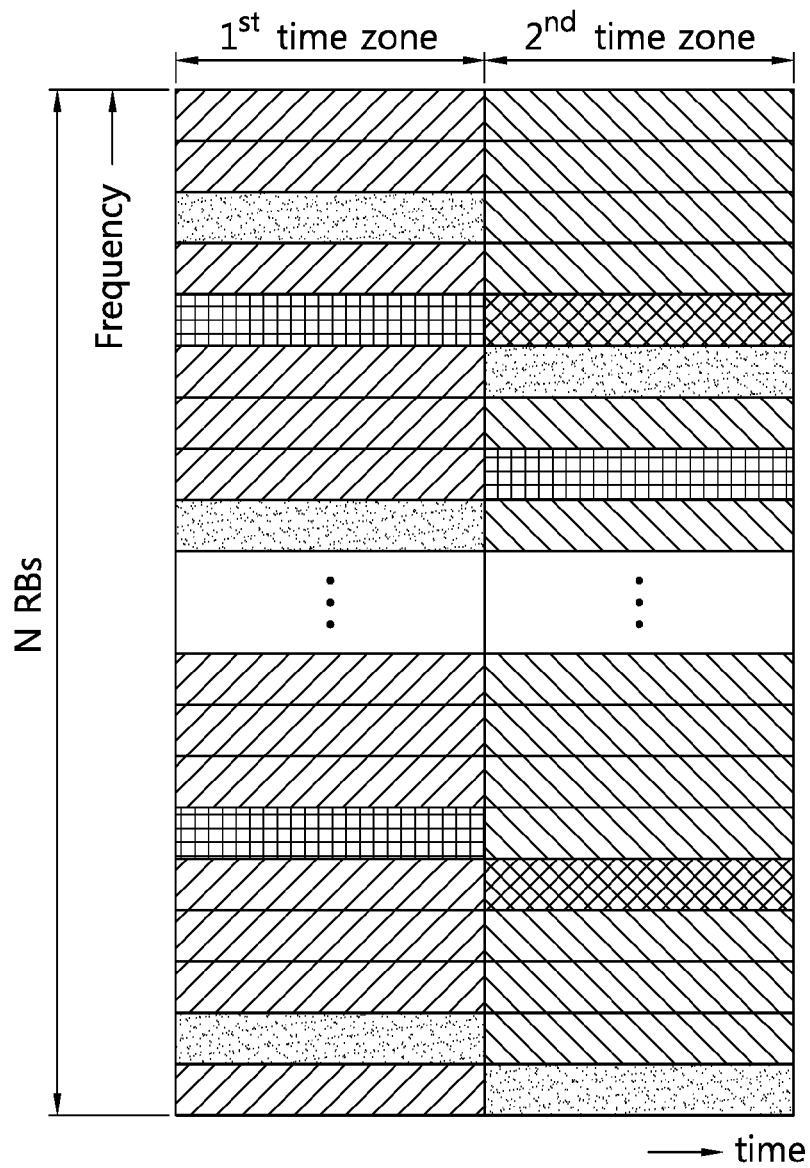
Figure 9C:
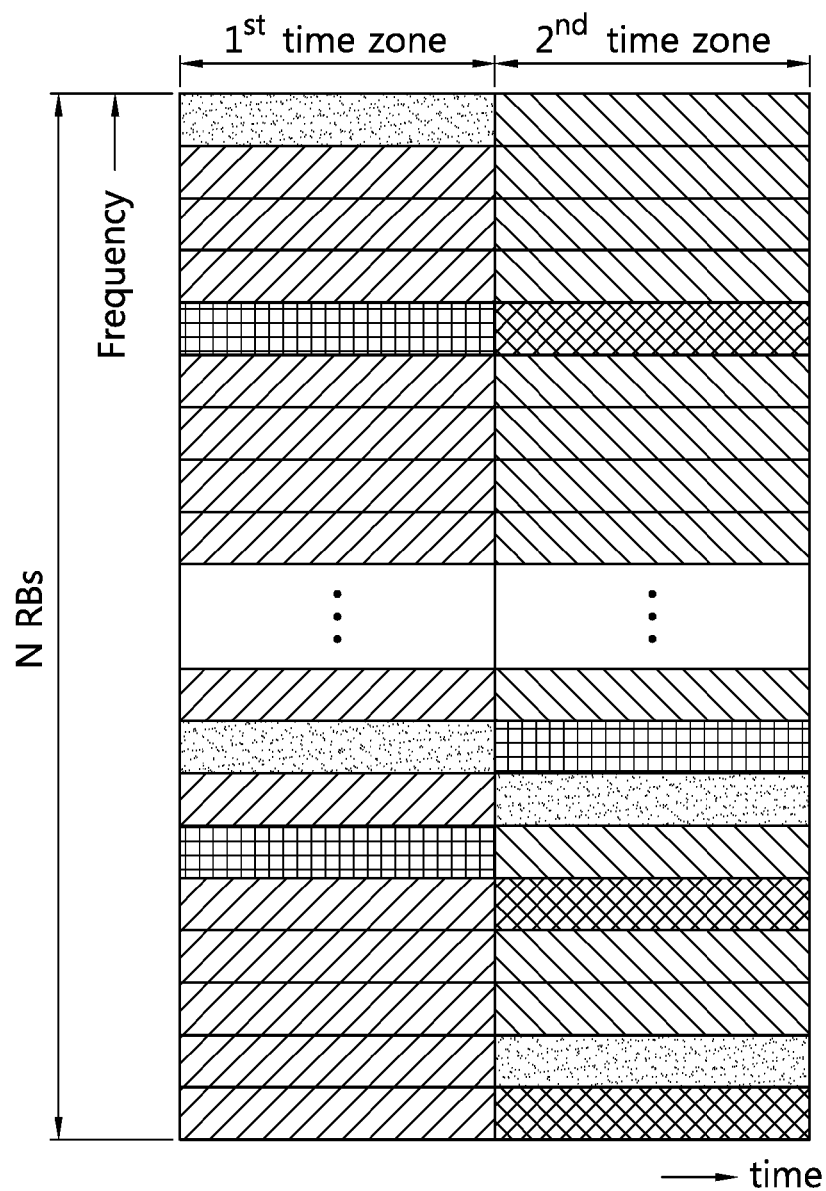

FIGS. 9(a) to 9(c) are diagrams showing the classification of RBs in a cell structure based on an SRN in accordance with a first embodiment of this specification.

The SRN compares the RBs of UEs within the $S_c$ of the SRN, that is, the coverage of the SRN, with each other and searches for an RB in which a collision has occurred. As shown in FIGS. 9a to 9c, RBs are indicated by an RB 920 for UE inside the coverage of the SRN and an RB 910 outside the coverage of the SRN. Here, if the RBs of UEs within the coverage of the SRN are identical with each other, the RBs are indicated by collision RBs 930.

A process of searching for a collision RB complies with the following process.

① Set $RB_{S_i}(l)$, $RB_{S_d}(m)$ at each $eNB_a$
② Mapping $RB_{S_c}{}^a(l)$ into $RB_{S_c}{}^a(k)$ at each $eNB_a$
For i=1:(A-1)
③ Find $RB_{S_c}{}^i(k)\_\_RB_{S_c}{}^a(k)$
④ Store collision_$k^i(q) \in \{\forall k | RB_{S_c}{}^i(k)\_\_RB_{S_c}{}^a(k)\}$
End Here, $q \in \{1, \ldots, Q\}$, and q and Q the indices and total number of collision RBs.

$\alpha$ satisfies $\alpha \in \{\forall a | \text{except current i}\}$ and means all 'a's except current 'i'.

The process of ① to ④ is sequentially described below. In ①, $RB_{S_i}(l)$ and $RB_{S_i}(m)$ are set for each $eNB_a$.

In ②, an RB Index is mapped to k instead of l for each $eNB_a$.

In ③, all indices in which the UE of an SRN uses the same RB are searched for in relation to each $eNB_a$.

In ④, an index k in which a collision RB or each $eNB_a$ is generated is designated as a parameter collision_$k^i(q)$ and stored as a vector string.

Resource Reallocation Process for Collision RB Avoidance

A resource reallocation process for collision RB avoidance at a second step is described below.

That is, the second step proposes a method of blocking the generation of ICI between eNBs in a cell boundary area using a collision RB index obtained in the first step. In particular, in this step, a method of exchanging an RB in which a collision has occurred and an RB outside the coverage of an SRN is chiefly described.

The procedure of the second step complies with the following process.

For a=1:A
For q=1:Q
For m=1:M
① Mapping $RB_{S_d}{}^a(m)$ into $RB_{S_d}{}^a(k)$ at each $eNB_a$
② $k' = \text{Argmin} |SINR_{collision\ k^a(q)} - SINR_{RBS_d}{}^a(k)|$
③ Change a collision_$k^{th}$ RB into a $(k')^{th}$ RB
④ Update $RB_{S_d}{}^a(m) \in \{RB_{S_d}{}^a(m) | \text{except mapped current } RB_{S_d}{}^a(k') \text{ to avoid RB collision}\}$
End
End
End In the first step, collision_$k_i(q)$ for each $eNB_a$ was calculated.

The second step proposes a method of removing a collision RB for each $eNB_a$ using the results in the first step.

The process of the second step is sequentially described below. First, in ①, $RB_{S_d}{}^a(m)$ is mapped into $RB_{S_d}{}^a(k)$ for each $eNB_a$.

In ②, a parameter k satisfying a corresponding equation $|SINR_{collision\ k^a(q)} - SINR_{RB^a S_d}(k)|$ is defined as k'. Here, the equation is related to the type of SRN.

An SRN does not need to obtain a higher SINR in the RB of $S_d$ because it performs retransmission after recognizing NACK. That is, the equation has been exploded by taking the fact that the signal of the same MCS level is retransmitted into consideration.

④ is a process l which an RB subject to the exchange of RA is updated by an SRN. In particular, in the RB set of $S_d$, an area without ICI is taken into consideration unlike in the area of $S_c$.

The resource reallocation method of an SRN according to a first embodiment is described below.

First, parameters are set as follows.
A=3($UE_{1,b}$, $UE_{2,b}$, $UE_{3,b}$),
B=20($UE_{1,1-20}$, $UE_{1,1-20}$, $UE_{1,1-20}$),
C=10($UE_{1,2}$, $UE_{1,8}$, $UE_{1,11}$, $UE_{1,17}$, $UE_{2,9}$, $UE_{2,13}$, $UE_{2,14}$, $UE_{3,1}$, $UE_{3,6}$, $UE_{3,9}$)
D=50 (Except following these C=10)
K=50 (RB total index),
$L^{(1)}$=7, $L^{(2)}$=11, $L^{(3)}$=5, $M^{(1)}$=43, $M^{(2)}$=39, $M^{(3)}$=45

Figure 10:
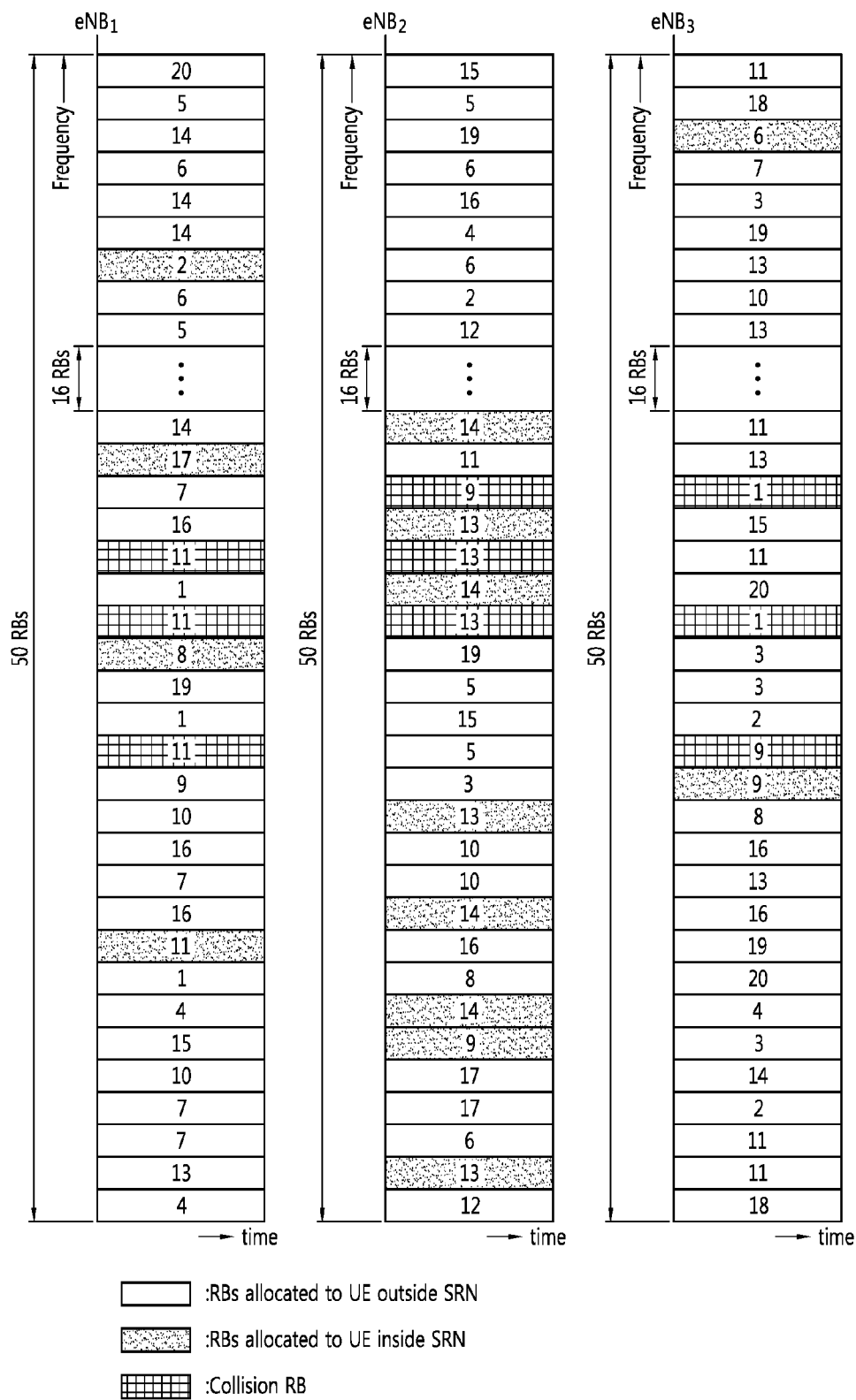
FIG. 10 is a diagram showing actual cases of collision RBs in a cell structure based on an SRN in accordance with the first embodiment of this specification.

FIG. 10 is a diagram showing actual cases of collision RBs in a cell structure based on an SRN in accordance with the first embodiment of this specification.

As shown in FIG. 10, assuming that an RB collision has occurred, a first step for searching for a collision RB can be represented as follows.

(1) Set $RB_{S_c}(l)$, $RB_{S_c}(m)$ at each $eNB_a$
:: $RB_{S_c}{}^1(1)$, $RB_{S_c}{}^1(2)$, $RB_{S_c}{}^1(3)$, $RB_{S_c}{}^1(4)$, $RB_{S_c}{}^2(1)$, $RB_{S_c}{}^2(2)$, $RB_{S_c}{}^2(3)$, $RB_{S_c}{}^3(1)$, $RB_{S_c}{}^3(2)$, $RB_{S_c}{}^3(3)$
(2) Mapping $RB_{S_c}{}^a(l)$ into $RB_{S_i}{}^a(k)$ at each $eNB_a$
For i=1:(A-1)
: $RB_{S_t}{}^1(1) \to RB_{S_t}{}^1(7)$, $RB_{S_t}{}^1(2) \to RB_{S_t}{}^1(27)$, $RB_{S_t}{}^1(3) \to RB_{S_t}{}^1(30)$, $RB_{S_t}{}^1(4) \to RB_{S_t}{}^1(32)$, $RB_{S_t}{}^1(5) \to RB_{S_t}{}^1(33)$, $RB_{S_t}{}^1(6) \to RB_{S_t}{}^1(36)$, $RB_{S_t}{}^1(7) \to RB_{S_t}{}^1(42)$
: $RB_{S_t}{}^2(1) \to RB_{S_t}{}^2(26)$, $RB_{S_t}{}^2(2) \to RB_{S_t}{}^2(28)$, $RB_{S_t}{}^2(3) \to RB_{S_t}{}^2(29)$, $RB_{S_t}{}^2(4) \to RB_{S_t}{}^2(30)$, $RB_{S_t}{}^2(5) \to RB_{S_t}{}^2(31)$, $RB_{S_t}{}^2(6) \to RB_{S_t}{}^2(32)$, $RB_{S_t}{}^2(7) \to RB_{S_t}{}^2(38)$, $RB_{S_t}{}^2(8) \to RB_{S_t}{}^2(41)$, $RB_{S_t}{}^2(9) \to RB_{S_t}{}^2(44)$, $RB_{S_t}{}^2(10) \to RB_{S_t}{}^2(45)$, $RB_{S_t}{}^2(11) \to RB_{S_t}{}^2(49)$,
: $RB_{S_t}{}^3(1) \to RB_{S_t}{}^3(3)$, $RB_{S_t}{}^3(2) \to RB_{S_t}{}^3(28)$, $RB_{S_t}{}^3(3) \to RB_{S_t}{}^3(32)$, $RB_{S_t}{}^3(4) \to RB_{S_t}{}^3(36)$, $RB_{S_t}{}^3(5) \to RB_{S_t}{}^3(37)$
For i=1:(A-1)
(3) Find $RB_{S_c}{}^i(k)\_\_RB_{S_c}{}^a(k)$
(4) Store collision_$ki(q) \in \{\forall k | RB_{S_c}{}^i(k)\_\_RB_{S_c}{}^a(k)\}$
: $RB_{S_c}{}^1(30)$, $RB_{S_c}{}^1(32)$, $RB_{S_c}{}^1(36)$
: $RB_{S_c}{}^2(28)$, $RB_{S_c}{}^2(30)$, $RB_{S_c}{}^2(32)$
: $RB_{S_c}{}^3(28)$, $RB_{S_c}{}^3(32)$, $RB_{S_c}{}^3(36)$
End An RB reallocation process through collision RB avoidance is described below through a second process based on a collision RB retrieved in the first step.

For a=1:A
For q=1:Q
For m=1:M
(1) Mapping $RB_{S_c}{}^a(m)$ into $RB_{S_c}{}^a(k)$ at each $eNB_a$
(2) $k' = \text{Argmin} |SINR_{collision\ k^a(q)} - SINR_{RBS_d}{}^a(k)|$
: Collision_$k^1(1)$=30, Collision_$k^1(2)$=32, Collision_$k^1(3)$=36
: Collision_$k^2(1)$=28, Collision_$k^2(2)$=30, Collision_$k^2(3)$=32
: Collision_$k^3(1)$=28, Collision_$k^3(2)$=32, Collision_$k^3(3)$=36

: $RB_{S_c}^1(k)$ are all RBs except $7^{th}$, $27^{th}$, $30^{th}$, $32^{nd}$, $33^{rd}$, $36^{th}$, and $42^{nd}$ RBs : $RB_{S_d}^2(k)$ are all RBs except $26^{th}$, $28^{th}$, $29^{th}$, $30^{th}$, $31^{st}$, $32^{nd}$, $38^{th}$, $41^{st}$, $44^{th}$, $45^{th}$, and $49^{th}$ RBs : $RB_{S_d}^3(k)$ are all RBs except $3^{rd}$, $28^{th}$, $32^{nd}$, $36^{th}$, and $37^{th}$ RBs (3) Change collision_$k^{th}$ RB into (k') RB (4) Update $RB_{S_d}^a(m) \in \{RB_{S_d}^a(m) |$except mapped current $RB_{S_d}^a(k')$ to avoid an RB collision$\}$ End End End FIG. 11 is a diagram showing a resource reallocation process for avoiding collision RBs in the cell structure based on an SRN in accordance with the first embodiment of this specification.

Figure 11:
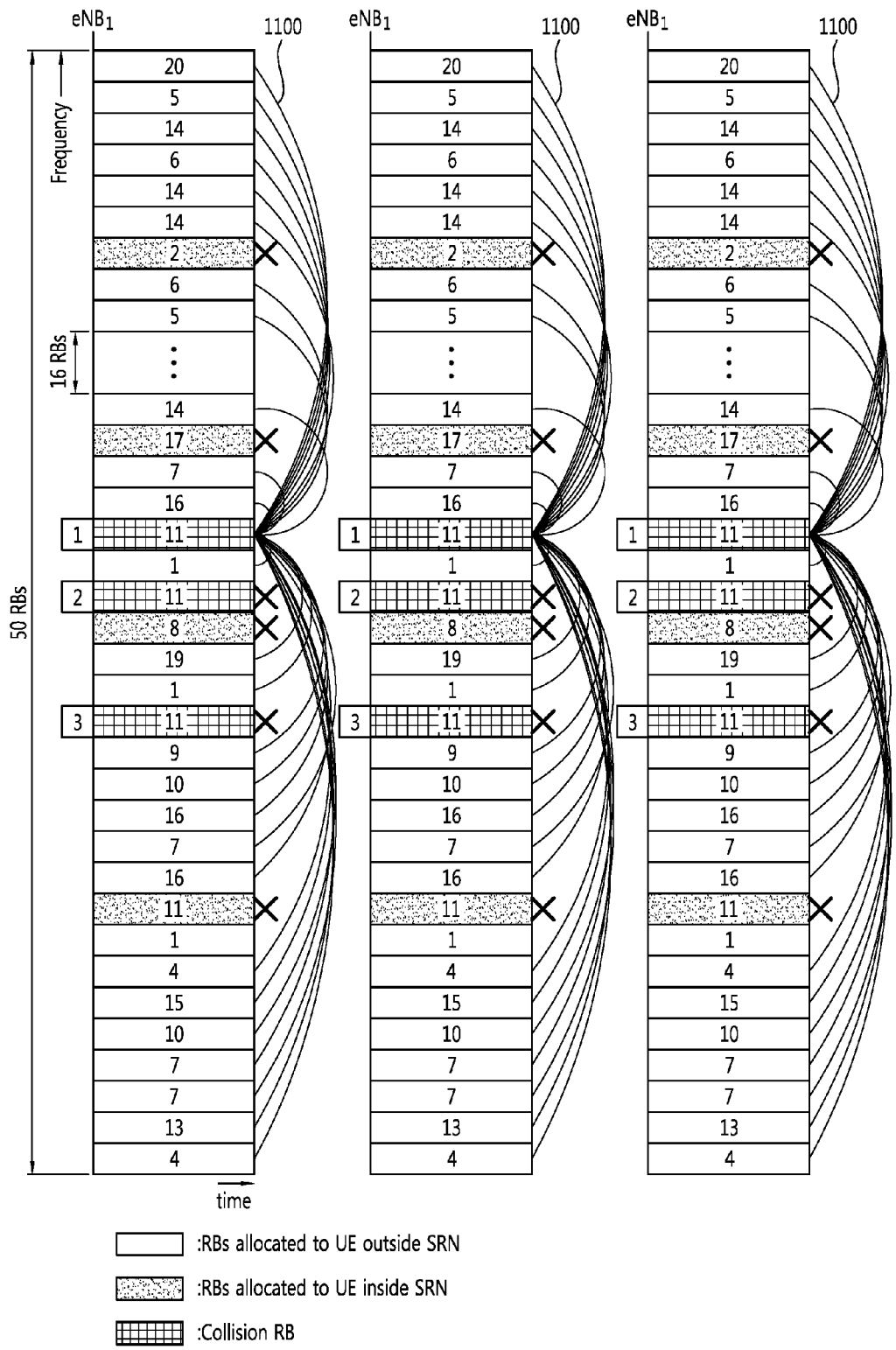
FIG. 11 is a diagram showing a resource reallocation process for avoiding collision RBs in the cell structure based on an SRN in accordance with the first embodiment of this specification.

In the second step, the SINR of an RB having a collision for each eNB is compared with the SINR of the RB of UE not laced in the coverage of an SRN, an RB having the smallest difference is selected, and the RBs are exchanged, as shown in FIG. 11. A dark solid line 1100 indicates an RB that can be replaced with a collision RB.

Second Embodiment

The second embodiment proposes a method of reallocating collided resources by transferring information for preventing a collision between resource regions, allocated to UE by an SRN, to an eNB.

If resources for UEs within the coverage of an SRN collide against each other, an SRN can transfer information for preventing a collision between the resources to eNBs so that the eNBs reallocate resources to the UEs in order to prevent the resources from colliding against each other.

Here, the information transferred from the SRN to the eNBs are listed in 1 to 2 below.

1. UE identifications (IDs) within the coverage of the SRN

: As described above, the SRN can check UEs within the coverage of the SRN. Accordingly, the SRN checks UEs within the SRN and transfer the IDs of the corresponding UEs to the eNBs.

2. UE ID having a collision between resources

: The SRN transfers the IDs of UEs in which NACK has occurred (i.e., a collision has occurred between resources) to the eNBs while overhearing downlink and uplink signals transmitted and received between the eNBs and the UEs.

Accordingly, the eNBs each of which has received the two pieces of information from the SRN exchange the RBs of UEs in which NACK has occurred in order to prevent a collision between resources for the UEs.

Here, an RB to be exchanged is performed in an RB other than the RBs of UEs within the coverage of the SRN.

Third Embodiment

The third embodiment provides a method of an SRN and eNBs together reallocating resources when a collision between resources is generated.

That is, the third embodiment provides a method in which an SRN processes resource allocation avoidance information partially and transfers the processed information to each eNB and each eNB reallocates resources in order to prevent ICI. A detailed method of the resource reallocation method according to the third embodiment can be performed as follows.

First, (1) all UEs within the SRN are classified into corresponding eNBs.

(2) The SRN calculates the number of UEs within the SRN for UEs served by each eNB proportionally.

(3) The SRN applies the proportion information calculated in (2) at a ratio of RBs and transfers the RB regions of SRN UEs to each eNB.

Here, the third embodiment is performed when a collision between resources is generated and can also prevent a collision in basic resource allocation by applying a method in which each eNB allocates resources so that a collision between the resources is not generated without an HARQ timing process.

That is, each eNB can prevent a collision when allocating resources by allocating the resources to UE according to the following methods.

(1) Each eNB receives a cell ID, correspond to each UE within an SRN, from the SRN and allocates resources to UEs using the cell ID. Particularly, First, the SRN overhears its own uplink SRS signal and determines UEs within the SRN. Next, the SRN checks the cell IDs of the UEs within the SRN and informs corresponding cells that the UEs are UEs within the SRN. (Here, it is assumed that resources have already been statically divided according to each cell.)

(2) The SRN classifies the UEs within the SRN based on each cell ID, classifies the UEs within the SRN according to corresponding cells, checks the number of UEs within the SRN in each cell, applies the number of UEs to the entire resource region proportionally, and informs a corresponding resource ratio by the cell. Accordingly, each eNB performs resource allocation to UEs. (i.e., a method of dynamically allocating resources according to the number of UEs within an SRN)

Figure 12:
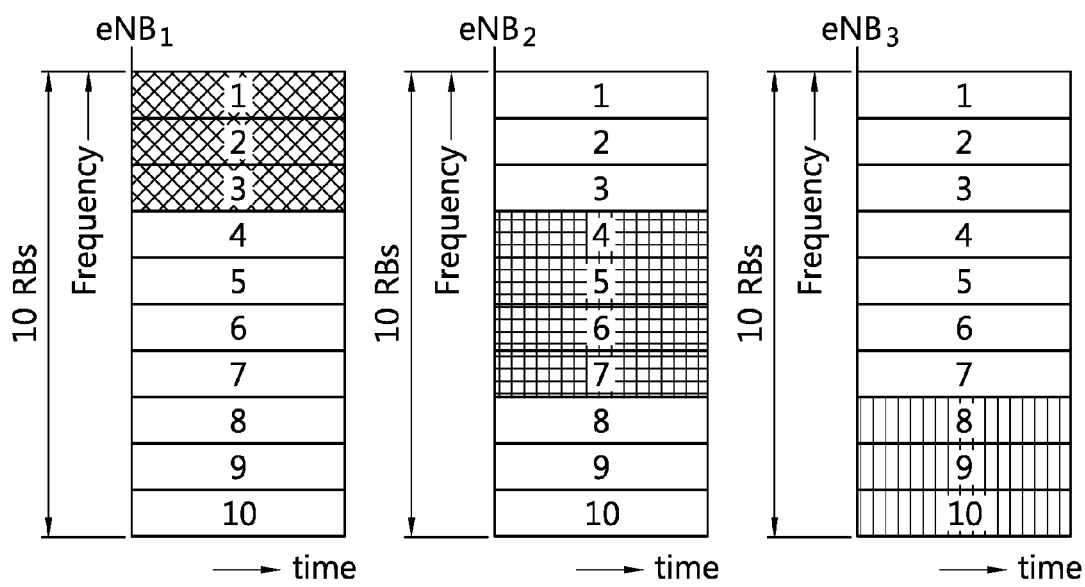
FIG. 12 is a diagram showing a resource reallocation method for avoiding ICI in accordance with a third embodiment of this specification.

FIG. 12 is a diagram showing a resource reallocation method for avoiding ICI in accordance with a third embodiment of this specification.

If the ratios of UEs served by eNBs are eNB1: eNB2: eNB3=3:4:3, RBs for UEs within the coverage of an SRN are allocated (1210, 1220, and 1230), as shown in FIG. 12.

That is, as shown in FIG. 12, the SRN transfers RBs allocated for UEs to each eNB, and each eNB first allocates RBs to UEs within the coverage of the SRN in a corresponding shadow area and dynamically allocates the remaining RBs to all other UEs.

The aforementioned embodiments are the results of the elements and characteristics of the present invention are combined in a specific form. Each of the elements or characteristics needs to be considered to be optional unless described otherwise explicitly. Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or characteristics of one embodiment may be included in the other embodiment or may be replaced with corresponding elements or characteristics of the other embodiment. It is evident that in the claims, one or more embodiments may be constructed by combining claims not having an explicit citation relation or may be included as one or more new claims by amendments after filing an application.

It is evident to those skilled in the art that the present invention may be materialized in other specific forms without departing from the spirit and essential characteristics of the present invention. Accordingly, the detailed description should not be construed as being limited from all aspects, but should be considered to be being illustrative. The scope of the present invention should be determined by reasonable analysis of the attached claims, and all changes within the equivalent range of the present invention are included in the scope of the present invention.

The invention claimed is:

1. A method for reallocating resources in order to avoid Inter-Cell Interference (ICI) in a wireless access system communicating by using a radio frame including a first time zone and a second time zone, the method performed by a Relay Node (RN) and comprising:
   in the first time zone, overhearing a control channel comprising downlink or uplink resource allocation information transmitted from each of a plurality of eNBs to user equipments (UEs) within a coverage of each of the plurality of eNBs, wherein the plurality of eNBs shares the RN;
   in the second time zone, checking whether or not a colliding resource region is present by comparing resource regions, allocated to UEs within a coverage of the RN, with each other through the control channel;
   in the second time zone, if the colliding resource region is present, transmitting, to the plurality of eNBs, information on first identifications of the UEs within the coverage of the RN and second identifications of UEs using the colliding resource region;
   in the second time zone, if the colliding resource region is present, exchanging the colliding resource region with resource regions allocated to UEs outside the coverage of the RN by using the first identifications and the second identifications, wherein the exchanged resource regions do not include the resource regions allocated to the UEs within the coverage of the RN; and
   in the second time zone, transmitting data to the UEs through the exchanged resource region,
   wherein the first time zone comprises downlink and uplink regions, and
   wherein the second time zone comprises downlink and uplink regions.

2. The method of claim 1, wherein the exchanging the colliding resource regions includes:
   comparing a Signal-to-Interference plus Noise Ratio (SINR) value of the colliding resource region with an SINR value of each of the resource regions allocated to the UEs outside the coverage of the RN; and
   determining a resource region, having a smallest SINR value difference as a result of the comparison, as the resource region to be exchanged.

3. The method of claim 1, wherein the plurality of eNBs performs a dynamic resource allocation based on Full Frequency Reuse (FFR).

4. The method of claim 1, wherein:
   the plurality of eNBs comprises 3 eNBs, and
   the RN is a Shared Relay Node (SRN) shared by the 3 eNBs.

5. The method of claim 1, wherein the performing the resource reallocation includes:
   classifying all the UEs within the coverage of the RN into UEs corresponding to each of the eNBs; and
   transmitting ratio information about the classified UEs to each of the eNBs.

6. The method of claim 5, wherein the ratio information about the classified UEs is transmitted to each of the eNBs through an X2 interface.

7. The method of claim 1, wherein the control channel is a Physical Downlink Control Channel (PDCCH) or a Physical Uplink Control Channel (PUCCH).

8. A Relay Node (RN) for reallocating resources in order to avoid Inter-Cell Interference (ICI) in a wireless access system communicating by using a radio frame including a first time zone and a second time zone, the RN comprising:
   a radio frequency (RF) communication unit for transmitting and receiving radio signals; and
   a processor, operatively coupled with the RF communication unit, configured to:
   in the first time zone, overhear a control channel comprising downlink or uplink resource allocation information transmitted from each of a plurality of eNBs to user equipments (UEs) within a coverage of each of the plurality of eNBs, wherein the plurality of eNBs shares the RN,
   in the second time zone, check whether or not a colliding resource region is present by comparing resource regions, allocated to UEs within a coverage of the RN, with each other through the control channel,
   in the second time zone, if the colliding resource region is present, transmit, to the plurality of eNBs, information on first identifications of the UEs within the coverage of the RN and second identifications of UEs using the colliding resource region,
   in the second time zone, if the colliding resource region is present, exchange the colliding resource region with resource regions allocated to UEs outside the coverage of the RN by using the first identifications and the second identifications, wherein the exchanged resource regions do not include the resource regions allocated to the UEs within the coverage of the RN, and
   in the second time zone, transmit data to the UEs through the exchanged resource region,
   wherein the first time zone comprises downlink and uplink regions, and
   wherein the second time zone comprises downlink and uplink regions.

9. The RN of claim 8, wherein the processor is configured to:
   compare a Signal-to-Interference plus Noise Ratio (SINR) value of the colliding resource region with an SINR value of each of the resource regions allocated to the UEs outside the coverage of the RN and determines a resource region, having a smallest SINR value difference as a result of the comparison, as the resource region to be exchanged.

10. The RN of claim 8, wherein the plurality of eNBs performs a dynamic resource allocation based on Full Frequency Reuse (FFR).

11. The RN of claim 8, wherein the processor is configured to:
   classify all the UEs within the coverage of the RN into UEs corresponding to each of the eNBs and transmit ratio information about the classified UEs to each of the eNBs.

* * * * *